(12) United States Patent
Huang et al.

(10) Patent No.: US 12,124,078 B2
(45) Date of Patent: Oct. 22, 2024

(54) PHOTONIC SILICON SPATIAL BEAM TRANSFORMER INTEGRATED ON 3DIC PACKAGE AND METHODS FOR FORMING THE SAME

(71) Applicant: Taiwan Semiconductor Manufacturing Company Limited, Hsinchu (TW)

(72) Inventors: Kuan-Yu Huang, Taipei (TW); Yu-Yun Huang, Hsinchu (TW); Tien-Yu Huang, Chiayi County (TW); Sung-Hui Huang, Yilan County (TW); Sen-Bor Jan, Tainan (TW); Shang-Yun Hou, Jubei (TW)

(73) Assignee: Taiwan Semiconductor Manufacturing Company Limited, Hsinchu (TW)

(*) Notice: Subject to any disclaimer, the term of this patent is extended or adjusted under 35 U.S.C. 154(b) by 402 days.

(21) Appl. No.: 17/548,660

(22) Filed: Dec. 13, 2021

(65) Prior Publication Data
US 2022/0365274 A1  Nov. 17, 2022

Related U.S. Application Data

(60) Provisional application No. 63/187,971, filed on May 13, 2021.

(51) Int. Cl.
  *G02B 6/12*  (2006.01)
  *G02B 6/124* (2006.01)
  *G02B 6/13*  (2006.01)

(52) U.S. Cl.
  CPC ........ *G02B 6/12002* (2013.01); *G02B 6/124* (2013.01); *G02B 6/13* (2013.01)

(58) Field of Classification Search
  CPC ........ G02B 6/12019; G02B 6/30; G02B 6/34; G02B 6/4201; G02B 6/4204; G02B 6/12002; G02B 6/12004; G02B 6/124; G02B 6/13
  See application file for complete search history.

(56) References Cited

U.S. PATENT DOCUMENTS 10,162,139 B1 * 12/2018 Wang ..................... G02B 6/122

* cited by examiner

*Primary Examiner* — Michael P Mooney
(74) *Attorney, Agent, or Firm* — The Marbury Law Group, PLLC

(57) ABSTRACT

A package assembly includes a package substrate including a first die that includes a photonic integrated circuit, a second die located on the first die, the second die including an electronic integrated circuit electrically connected to the photonic integrated circuit, and an interposer module on the package substrate, at least a portion of the interposer module being located on the first die and electrically connected to the photonic integrated circuit.

20 Claims, 24 Drawing Sheets

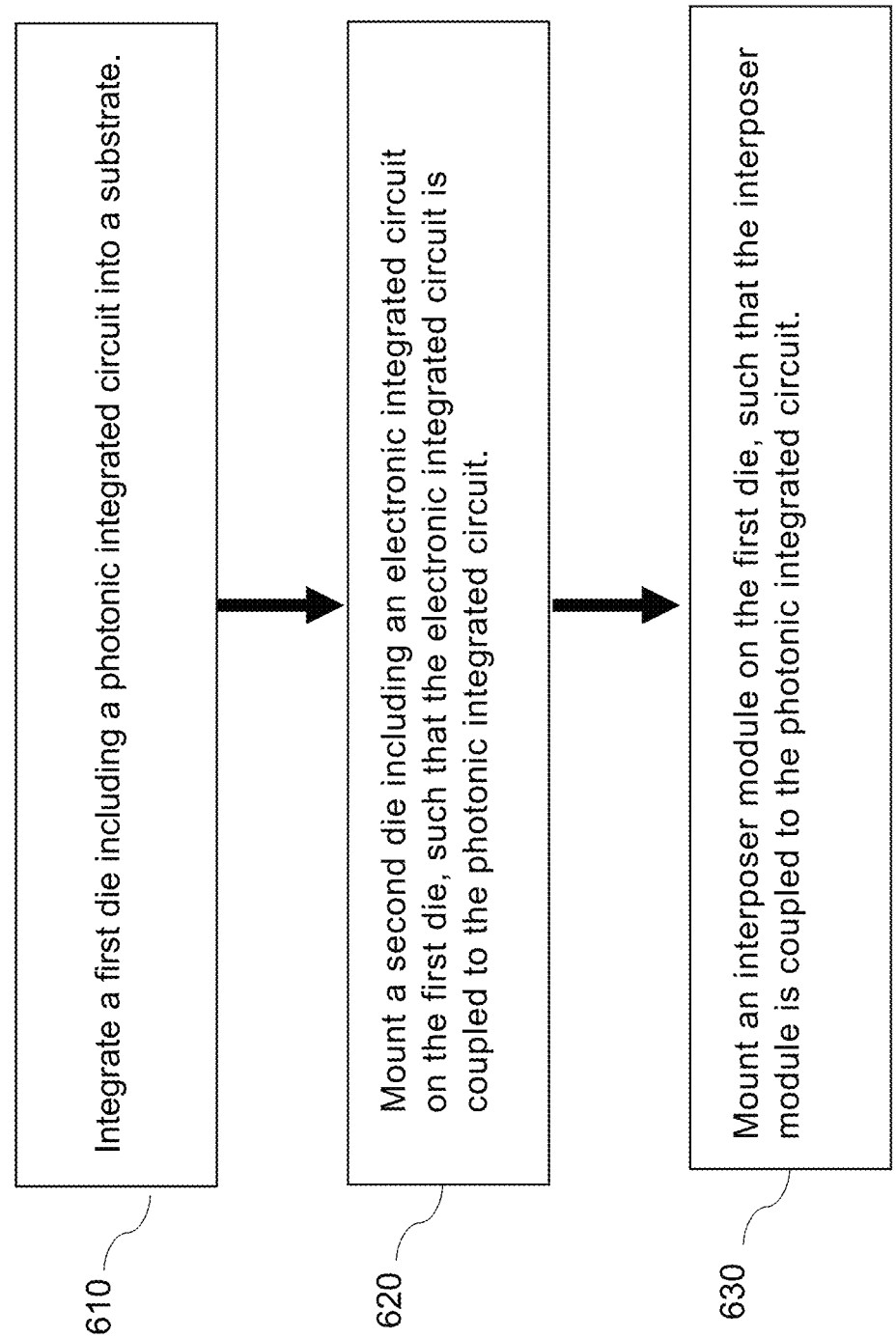

PHOTONIC SILICON SPATIAL BEAM TRANSFORMER INTEGRATED ON 3DIC PACKAGE AND METHODS FOR FORMING THE SAME

RELATED APPLICATIONS

This application claims the benefit of priority from U.S. Provisional Application No. 63/187,971, entitled "Photonic Silicon SBT Integrated on 3DIC Package," filed on May 13, 2021, the entire contents of which are incorporated herein by reference for all purposes.

BACKGROUND

Currently, semiconductor packages including both photonic dies (known as P-dies) and electronic dies (known as E-dies) are becoming increasingly popular for their compactness. In addition, due to the wide use of optical fiber-related applications for signal transmission, optical signaling and processing have been used in more applications. Although existing methods of fabricating the semiconductor packages have been generally adequate for their intended purposes, they have not been entirely satisfactory in all respects. In particular, there is a desire to develop robust processes for interconnecting P-dies, E-dies, and optical fibers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a flowchart illustrating a method of making a package assembly according to one or more embodiments.

DETAILED DESCRIPTION

Figure 1A:
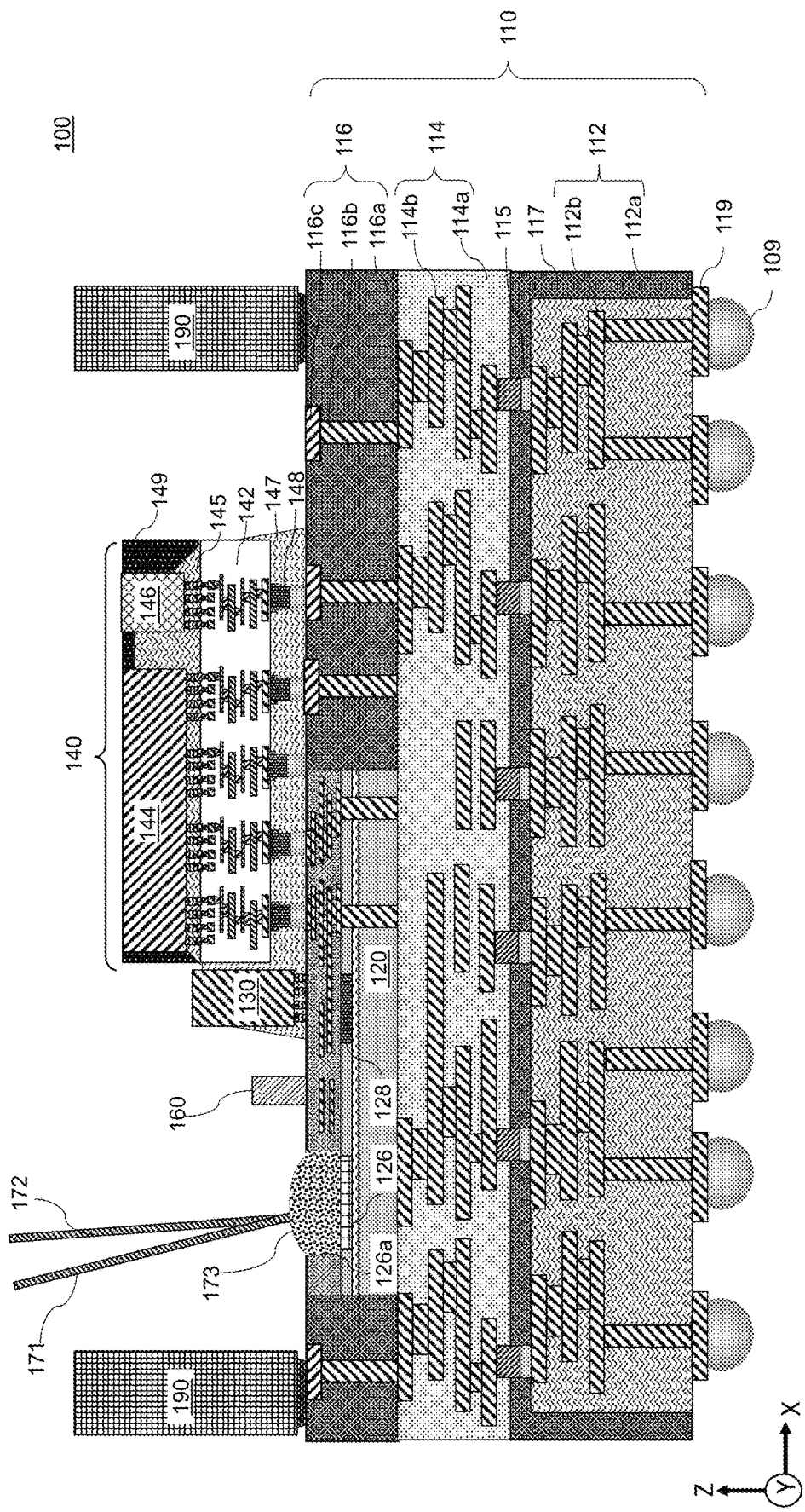
FIG. 1A illustrates a vertical cross-sectional view (along the cross-section A-A' in FIG. 2A) of a package assembly according to one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

Typically, a high-performance computing (HPC) application may utilize a memory-controller module (MCM) that includes an electronic die with an integrated photonic component (e.g., a photonic die integrated MCM). The MCM module may be mounted, for example, on a package substrate (e.g., traditional build-up substrate) adjacent to an interposer module (e.g., CoWoS® assembly) including one or more semiconductor dies for supporting the HPC application. However, with this typical configuration, a signal (e.g., optical signal and/or electrical signal) between the MCM module and the interposer module (e.g., HPC application) may be required to travel a relatively long distance through the package substrate or a printed circuit board (PCB).

One or more embodiments may provide a photonic silicon integrated substrate on a three-dimensional integrated circuit (3DIC) package. That is, instead of utilizing the MCM module with an integrated photonic component, one or more embodiments of the invention may utilize a photonic substrate (e.g., a system on integrated substrate (SoIS) photonic substrate). The photonic substrate may include, for example, a package substrate with an integrated photonic silicon die (e.g., photonic silicon component).

There may be many advantages associated with one or more of the disclosed embodiments. Various embodiments may have a reduced connection distance between an electronic die (e.g., E-die) and the interposer module (e.g., CoWoS® (S,L,R) assembly). Optical fibers may be connected directly to a grating coupler opening (GCO) in the photonic silicon component (e.g., photonic die) without the need for an additional interface. The electronic die may be easily integrated with the interposer module by using microbumps to connect the electronic die to the photonic silicon component, and using C4 copper bumps to connect the interposer module to the photonic silicon component. Further, integrating the photonic silicon component into the substrate may utilize an SoIS wafer level process.

FIG. 1A illustrates a vertical cross-sectional view (along the cross-section A-A' in FIG. 2A) of a package assembly 100 according to one or more embodiments. Generally, the package assembly 100 may include a package substrate 110 (e.g., photonic integrated package substrate). The package substrate 110 may include a core substrate 112 that may include a core substrate dielectric layer 112a and one or more metal interconnect structures 112b formed in the core substrate dielectric layer 112a. The core substrate dielectric layer 112a may include a plurality of dielectric layers and may be formed, for example, of an epoxy-based dielectric material, a resin-based dielectric material or a polymer material. The metal interconnect structures 112b may include a plurality of metal layers and may be formed, for example, of a metal (e.g., copper, silver, tungsten, titanium, gold, etc.), metal alloy, a combination thereof.

A back-side RDL 119 may be formed on the bottom surface of the core substrate 112. The back-side RDL 119 may include one or more metal layers and may be formed, for example, of a metal (e.g., copper, silver, tungsten, titanium, gold, etc.), metal alloy, a combination thereof. The back-side RDL 119 may also include one or more solder mask defined (SMD) pads. An array of solder balls 109 may also be formed on the back-side RDL 119 for allowing the package substrate 110 to be mounted to a printed circuit board (PCB) substrate.

The package substrate 110 may also include a front-side redistribution layer (RDL) 114 on the core substrate 112. The front-side RDL 114 may include a front-side RDL dielectric layer 114a and one or more metal interconnect structures 114b (e.g., metal redistribution layers) formed in the front-side RDL dielectric layer 114a. The front-side RDL dielectric layer 114a may include a plurality of dielectric layers. The plurality of dielectric layers forming portions of the front-side RDL dielectric layers 114a may include a plurality, for example, of a dielectric polymer material such as polyimide (PI), benzocyclobutene (BCB), or polybenzobisoxazole (PBO). The metal interconnect structures 114b may include a plurality of metal layers and may be formed, for example, of a metal (e.g., copper, silver, tungsten, titanium, gold, etc.), metal alloy, a combination thereof. The metal interconnect structures 114b in the front-side RDL dielectric layer 114a may be connected to the metal interconnect structures 112b in the core substrate 112a by one or more microbumps 115.

A first package substrate molding material layer 117 may be formed on the core substrate 112 and encapsulate the core substrate 112. In particular, the first package substrate molding material layer 117 may be formed around the core substrate 112, and on the front-side RDL 114 and around the microbumps 115 in order to securely fix the front-side RDL 114 to the core substrate 112. The first package substrate molding material layer 117 may include, for example, an epoxy material (e.g., epoxy molding compound (EMC)).

A second package substrate molding material layer 116 may be formed on the front-side RDL 114. The second package substrate molding material layer 116 may include, for example, a molding material layer 116a, one or more via structures 116b (e.g., copper vias) formed in the molding material layer 116a. One or more bonding pads 116c may also be formed in the molding material layer 116a on the via structures 116b (e.g., copper vias). The molding material layer 116a may include, for example, an epoxy material (e.g., epoxy molding compound (EMC)). The via structures 116b and bonding pads 116c may each include one or more metal layers and may be formed, for example, of a metal (e.g., copper, silver, tungsten, titanium, gold, etc.), metal alloy, a combination thereof.

The package substrate 110 may also include a first die 120 that may be encapsulated by (e.g., integrated into) the second package substrate molding material layer 116. The first die 120 may include a photonic die that may include a photonic integrated circuit 128. The first die 120 may be formed of photonic silicon and included within the body of the package substrate 110, so that the package substrate may be described as a photonic-integrated substrate or SoIS photonic substrate. The photonic silicon in the first die 120 may allow for high-speed optical signal transmission. The first die 120 may convert an input optical signal into an electrical signal, and may convert an electrical signal into an output optical signal. An upper surface of the first die 120 may be substantially co-planar with an upper surface of the second package substrate molding material layer 116.

A ring 190 may be mounted on the package substrate 110 in order to constrain a flatness of the package substrate 110. The ring 190 may include a rigid metal ring and may be formed, for example, of copper or stainless steel.

A second die 130 may be mounted on the package substrate 110 and in particular, on the first die 120. The second die 130 may include an electronic integrated circuit that may be electrically coupled to the photonic integrated circuit 128 in the first die 120. An interposer module 140 may also be mounted on package substrate 110. In particular, a first portion of the interposer module 140 may be located on the first die 120 and a second portion of the interposer module 140 may be located on the second package substrate molding material layer 116. The interposer module 140 may be coupled to the photonic integrated circuit 128 in the first die 120, and coupled to the electronic integrated circuit through the photonic integrated circuit 128. The interposer module 140 may include an interposer dielectric layer 142, and a main interposer module die 144 and semiconductor chip 146 mounted on the interposer dielectric layer 142. An underfill layer 147 may be formed under and around the second die 130 and the interposer module 140 so as to fix the second die 130 and the interposer module 140 the package substrate 110. It should be noted that the underfill layer 147 may include a curved upper surface.

The main interposer module die 144 may include, for example, a system assembly such as a system on chip (SOC) assembly or a system on integrated chip (SoIC) assembly. The semiconductor chip 146 may include a high-bandwidth memory (HBM) chip mounted on the interposer dielectric layer 142. In particular, the interposer module 140 may include a high-performance computing (HPC) application and may include, for example, an integrated graphics processing unit (GPU), application specific integrated circuit (ASIC), field-programmable gate array (FPGA), and HBM by chip on wafer on substrate (CoWoS®) technology or integrated fan-out on substrate (INFO-oS) technology.

An interposer underfill layer 145 may be formed between the main interposer module die 144 and the interposer dielectric layer 142, and between the semiconductor chip 146 and the interposer dielectric layer 142. The interposer underfill layer 145 may also be formed between main interposer module die 144 and the semiconductor chip 146. The interposer underfill layer 145 may be formed of an epoxy-based polymeric material. It should be noted that the interposer underfill layer 145 may include a curved upper surface. A molding layer 149 may be formed over the main interposer module die 144, the semiconductor chip 146, the interposer underfill layer 145 and the interposer dielectric layer 142. The molding layer 149 may be formed of an epoxy molding compound (EMC).

The second die 130 may include a controller (e.g., control circuit) for controlling an operation of the interposer module 140. For example, the semiconductor chip 146 may include the HBM chip and the second die 130 may include a memory controller (e.g., memory control module (MCM)) for controlling an operation of the HBM chip.

A light source device 160 for generating a light (e.g., laser light) that may be used to generate an output optical signal may also be mounted on the package substrate 110 and in particular, on the first die 120 that may be formed in the package substrate 110. The light source device 160 may be used as a continuing light resource in the first die 120. For example, a photonic modulator in the photonic integrated circuit 128 in the first die 120 may be controlled by the electronic integrated circuit in the second die 130 to modulate a light from the light source device 160 so as to generate an output optical signal. The light source device 160 may include, for example, a laser micro-package (LAMP) device that may include a laser diode for producing a laser light that may be used to generate the output optical signal.

One or more optical fibers may be connected to the first die 120 and used to transmit an input optical signal into the first die 120 and transmit an output optical signal out of the first die 120. In particular, as illustrated in FIG. 1, a first optical fiber 171 and second optical fiber 172 may be connected to a grating coupler 126 in the first die 120 and secured to the first die 120 by optical interface layer 173 (e.g., optical glue). The grating coupler 126 may include a structure for changing a light direction from vertical to horizontal and from horizontal to vertical.

In particular, an end of the first optical fiber 171 and an end of the second optical fiber 172 may be inserted into a grating coupler opening (GCO) in the first die 120 and the optical interface layer 173 may be formed around the ends of the first optical fiber 171 and second optical fiber 172 in the GCO. The first optical fiber 171 may transmit an input optical signal (e.g., first optical signal) to the photonic integrated circuit in the first die 120, and the second optical fiber 172 may transmit an output optical signal (e.g., second optical signal) from the first die 120 (e.g., out of the package assembly 100). The input optical signal may include data to be ultimately transmitted to the interposer module 140, and the output optical signal may include data that has been transmitted from the interposer module 140.

Figure 1B:
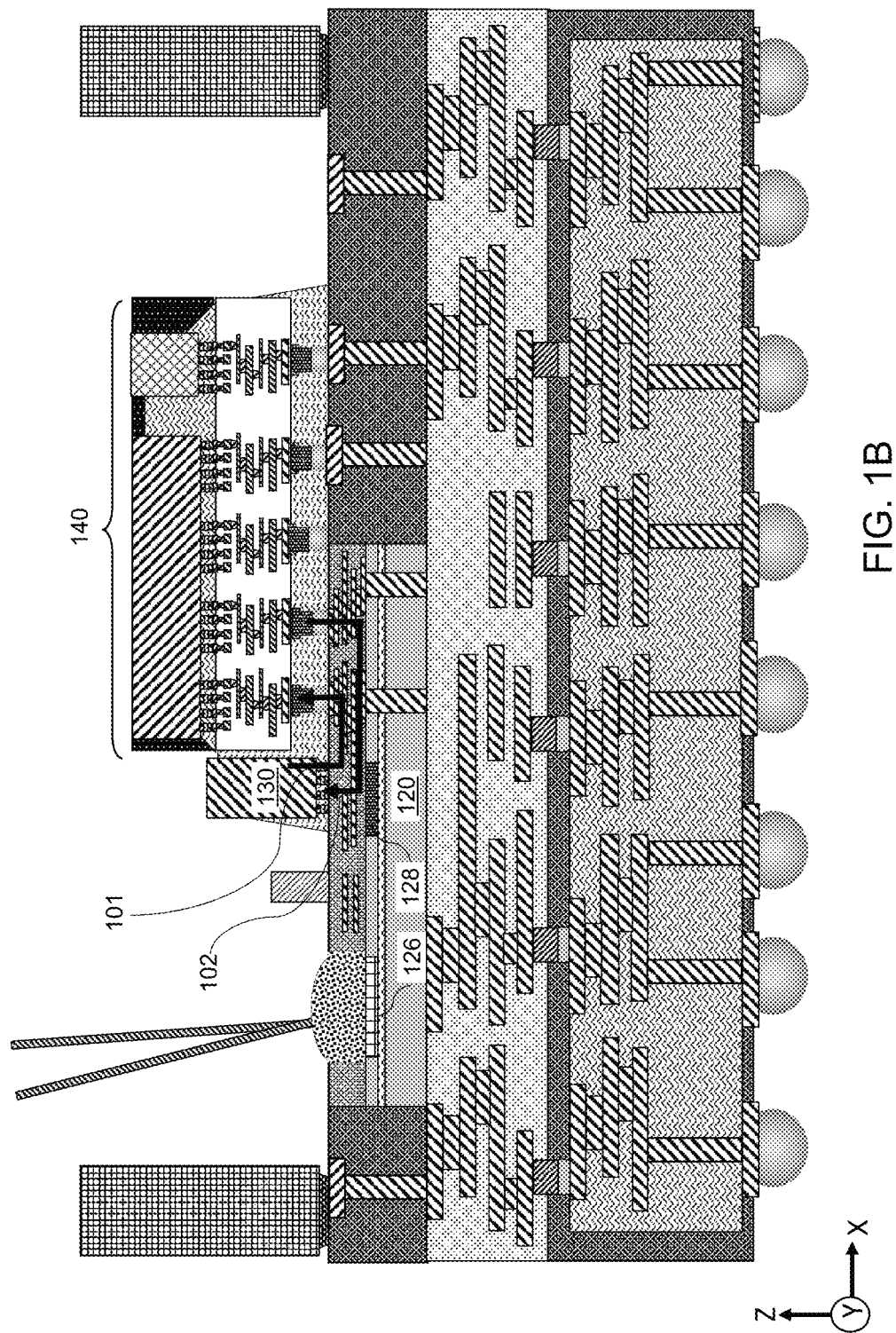
FIG. 1B illustrates a vertical cross-sectional view of the package assembly including a signal direction according to one or more embodiments.

FIG. 1B illustrates a vertical cross-sectional view of the package assembly 100, including a signal direction according to one or more embodiments. As illustrated in FIG. 1B, with the configuration of the package assembly 100, the second die 130 may be located in close proximity to the interposer module 140. In particular, a distance (in the x-direction) between the second die 130 and the interposer module 140 may be less than about 2 mm. Such a close proximity provided between the second die 130 and interposer module reduces the resistance between the second die 130 and the main interposer module die 144 and semiconductor chip 146. The first die 120 may convert the input optical signal into an input electrical signal and transmit the input electrical signal to the electronic integrated circuit in the second die 130. The second die 130 may generate an interposer module input signal 101 (e.g., an electrical signal) based on the input electrical signal, and transmit the interposer module input signal 101 to the interposer module 140 through one or more wiring layers in the first die 120. The interposer module 140 may generate an interposer module output signal 102 (e.g., an electrical signal) and transmit the interposer module output signal 102 to the second die 130 through one or more wiring layers in the first die 120.

Based on the interposer module output signal 102, the electronic integrated circuit in the second die 130 may generate an electrical control signal for controlling one or more devices such as a photonic modulator in the photonic integrated circuit 128 in the first die 120. The photonic modulator in the photonic integrated circuit 128 may generate an output optical signal under the control of the electrical control signal, and transmit the output optical signal to the second optical fiber 172.

Thus, by integrating the first die 120 (e.g., photonic die) in the package substrate 110, the second die 130 may be located in close proximity to the interposer module 140, and a distance that the input interposer module signal 101 may be required to travel in the first die 120 may be reduced, as compared to a design in which the first die 120 is not integrated in the package substrate 110. In addition, a distance that the output interposer module signal 102 may be required to travel in the first die 120 may be reduced, as compared to a design in which the first die 120 is not integrated in the package substrate 110. This may allow for a reduction in energy required to transmit the input interposer module signal 101 and the output interposer module signal 102, and may allow for an improved quality (e.g., decreased attenuation) of the input interposer module signal 101 and the output interposer module signal 102.

Figure 2A:
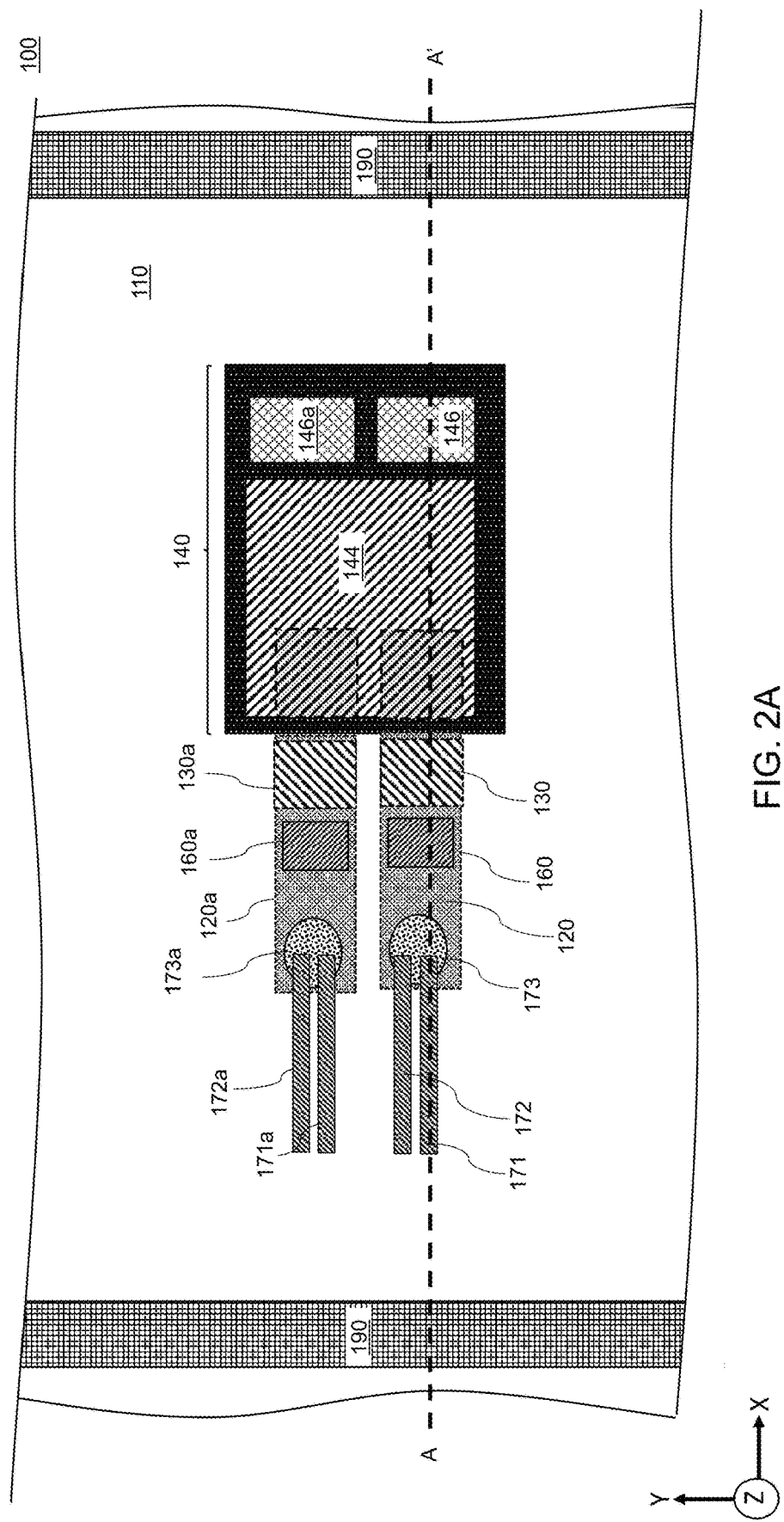
FIG. 2A illustrates a partial plan view of the package assembly according to one or more embodiments.

FIG. 2A illustrates a partial plan view of the package assembly 100 according to one or more embodiments. As illustrated in FIG. 2A, the package assembly 100 may include the package substrate 110 and the package substrate 110 may include the integrated first die 120 (e.g., photonic die). The interposer module 140 may be mounted (e.g., partially mounted) on the first die 120 and may include the SoC assembly 144 (or SoIC assembly) and the semiconductor chip 146 (e.g., HBM chip). In FIG. 2A, the dashed lines in the SoC assembly 144 are used to illustrate an outline of the portion of the first die 120 on which the interposer module 140 may be mounted.

The second die 130 may also be mounted on the first die 120 in close proximity to the interposer module 140. The light source device 160 may also be mounted on the first die 120, and the first optical fiber 171 and second optical fiber 172 may be connected to the first die 120 (e.g., the grating coupler 126 in the first die 120) and secured to the first die 120 by the optical interface layer 173.

As illustrated in FIG. 2A, the package substrate 110 may include another integrated first die 120a (e.g., photonic die). The interposer module 140 may be mounted on the first die 120a and may include another semiconductor chip 146a (e.g., HBM chip). The semiconductor chips 146 and 146a may or may not be associated with the first dies 120 and 120a, respectively. In FIG. 2A, dashed lines in the SoC assembly 144 are used to illustrate an outline of the portion of the first die 120a on which the interposer module 140 may be mounted.

A second die 130a may also mounted on the first die 120a in close proximity to the interposer module 140. The light source device 160a may also be mounted on the first die 120, and a first optical fiber 171a and second optical fiber 172a may be connected to the first die 120a (e.g., connected to a grating coupler in the first die 120a) and secured to the first die 120a by the optical interface layer 173a.

Figure 2B:
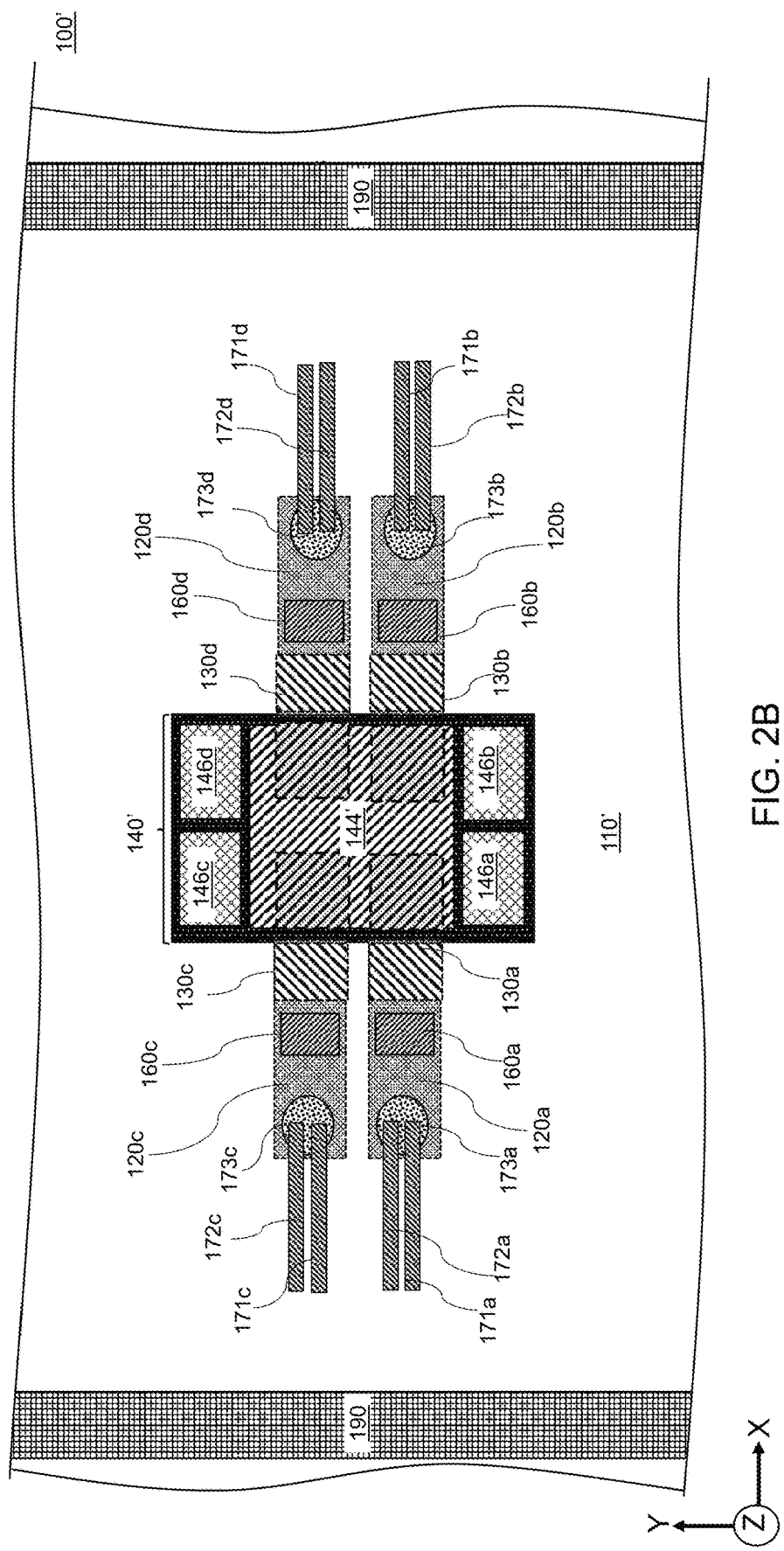
FIG. 2B illustrates a partial plan view of an alternative package assembly according to one or more embodiments.

FIG. 2B illustrates a partial plan view of an alternative package assembly 100' according to one or more embodiments. The package assembly 100' may include a package substrate 110' and the package substrate 110' may include four integrated first dies 120a, 120b, 120c and 120d (e.g., photonic die). An interposer module 140' may be mounted (e.g., partially mounted) on the four first dies 120a, 120b, 120c and 120d, and may include the SoC assembly 144' (or SoIC assembly) and four semiconductor chips 146a, 146b, 146c, 146d. The four semiconductor chips 146a, 146b, 146c and 146d may or may not be associated with the four first dies 120a, 120b, 120c and 120d, respectively. In FIG. 2B, the dashed lines in the SoC assembly 144' are used to illustrate an outline of the portion of the four first dies 120a, 120b, 120c and 120d on which the interposer module 140' may be mounted.

Mounted on the first die 120a may be a second die 130a (e.g., in close proximity to the interposer module 140') and a light source device 160a. Also mounted on the first die 120a may be a first optical fiber 171a and second optical fiber 172a that may be connected to the first die 120a (e.g., connected to a grating coupler in the first die 120a) and secured to the first die 120a by the optical interface layer 173a.

Mounted on the first die 120b may be a second die 130b (e.g., in close proximity to the interposer module 140') and the light source device 160b. Also mounted on the first die 120b may be a first optical fiber 171b and second optical fiber 172b which may be connected to the first die 120b (e.g., connected to a grating coupler 126 in the first die 120b) and secured to the first die 120b by the optical interface layer 173b.

Mounted on the first die 120c may be a second die 130c (e.g., in close proximity to the interposer module 140') and the light source device 160b. Also mounted on the first die 120c may be a first optical fiber 171c and second optical fiber 172c which may be connected to the first die 120c (e.g., connected to a grating coupler 126 in the first die 120c) and secured to the first die 120c by the optical interface layer 173c.

Mounted on the first die 120d may be a second die 130d (e.g., in close proximity to the interposer module 140') and the light source device 160d. Also mounted on the first die 120d may be a first optical fiber 171c and second optical fiber 172c which may be connected to the first die 120d (e.g., connected to a grating coupler 126 in the first die 120d) and secured to the first die 120d by the optical interface layer 173d.

Figure 3:
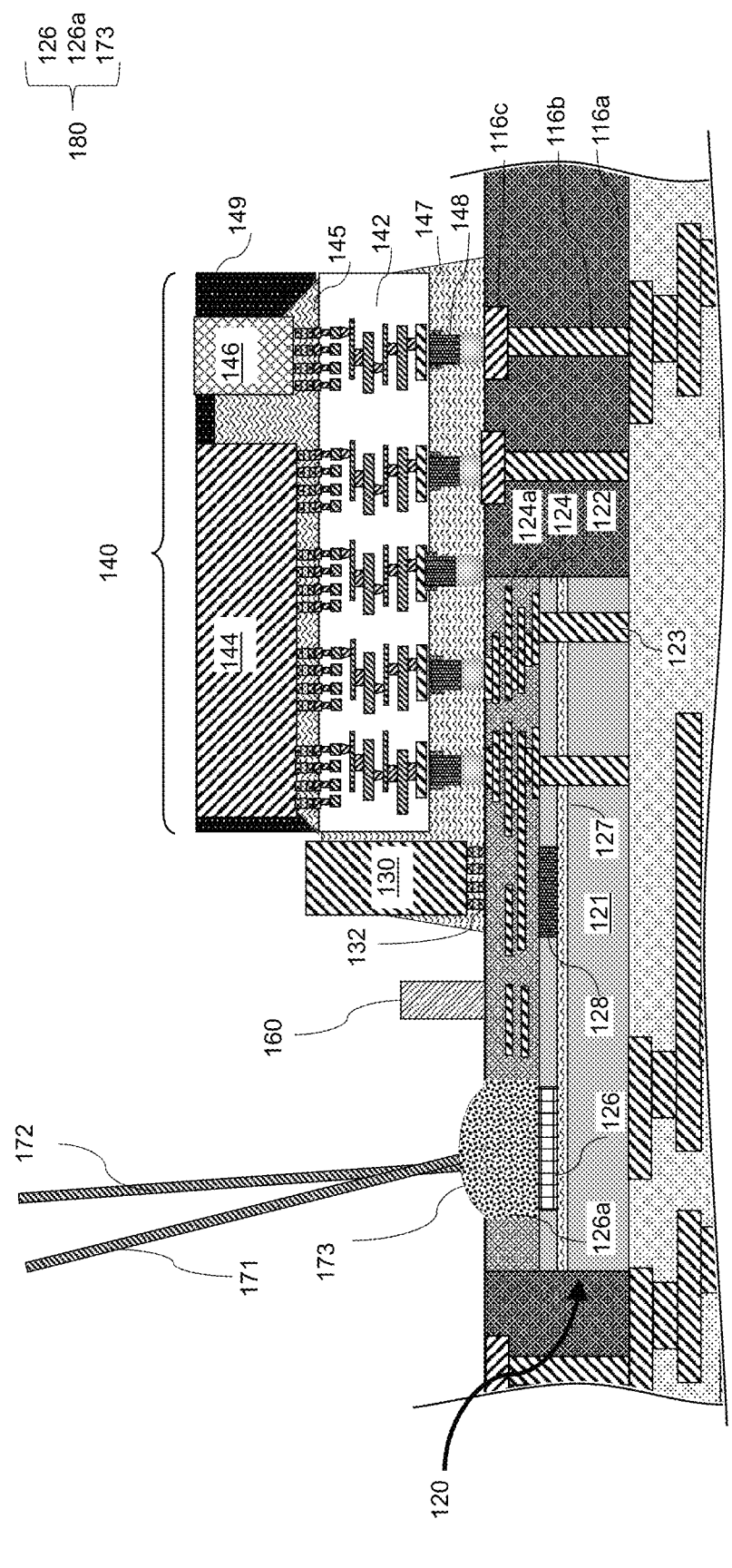
FIG. 3 provides a detailed vertical cross-sectional view of the first die (e.g., photonic die) according to one or more embodiments.

FIG. 3 provides a detailed vertical cross-sectional view of the first die 120 (e.g., photonic die) according to one or more embodiments. As illustrated in FIG. 3, the first die 120 may include a semiconductor substrate 121 (e.g., silicon substrate) that may be formed of a semiconductor material such as photonic silicon. The semiconductor substrate 121 may alternatively include a germanium substrate or a silicon germanium substrate.

The first die 120 may also include an optical waveguide 127 on the semiconductor substrate 121. The optical waveguide 127 may extend across much of the length (in the x-direction) of the first die 120, and may optically couple the photonic integrated circuit 128 and grating coupler 126. In particular, the optical waveguide 127 may be aligned with the grating coupler 126 so as to receive and guide an input optical signal as it exits the grating coupler 126, as well as guide an output optical signal into the grating coupler 126. A semiconductor layer 122 may be formed on the optical waveguide 127. The semiconductor layer 122 may include, for example, a silicon layer or other semiconductor materials. One or more through silicon vias (TSVs) 123 may be formed in the semiconductor substrate 121, optical waveguide 127 and semiconductor layer 122. The TSVs 123 may include, for example, a metal (e.g., copper, silver, tungsten, titanium, gold, etc.) a metal alloy, or a combination thereof.

A dielectric layer 127 may be formed on the semiconductor layer 122 and may include one or more interconnect structures 124a (e.g., metal interconnect layers) for electrically connecting the features of the first die 120 to the second die 130 and the interposer module 140. The interconnect structures 124a may be connected to the TSVs 123, and may also include, for example, a metal (e.g., copper, silver, tungsten, titanium, gold, etc.) a metal alloy, or a combination thereof.

The first die 120 may also include an optical input/output (I/O) port 180 where optical signals may enter and/or exit the first die 120. The optical I/O port 180 may include the grating coupler 126 and the GCO 126a that is formed in the dielectric layer 124. The GCO 126a may be formed by etching an opening in the dielectric layer 124 so as to expose the grating coupler 126. The grating coupler 126 may include, for example, fin-shaped structures to create a refractive index variation and a diffraction effect. The diffraction effect of the grating coupler 126 may change a light direction of an optical input signal from the first optical fiber 171 from a Z-direction (e.g., substantially in the Z-direction) to the X-direction, and may change a light direction of an optical output signal to be transmitted by the second optical fiber 172 from the X-direction to the Z-direction (e.g., substantially in the Z-direction). The grating coupler 126 may have a broad bandwidth with small polarization dependent loss.

The optical input/output (I/O) port 180 may also include an optical interface layer 173 (e.g., optical glue) that is formed in the GCO 126a so as to fix an end of the first optical fiber 171 and an end of the second optical fiber 172 to the grating coupler 126. The optical interface layer 173 may bond the end of the first optical fiber 171 and the end of the second optical fiber 172 to the grating coupler 126 within the GCO 126a. The end of the first optical fiber 171 and the end of second optical fiber 172 may be inserted into the GCO 126a and precisely aligned with a surface of the grating coupler 126. An angle (e.g., between a few degrees to about 90 degrees) may be formed between a fiber axis of the first optical fiber 171 and the surface of the grating coupler 126, and between a fiber axis of the second optical fiber 172 and the surface of the grating coupler 126. The angle between the fiber axis and the surface of the grating coupler 126 may be adjusted depending on the characteristics of the first optical fiber 171 and second optical fiber 172 and depending on how well the optical connection is optimized.

The first optical fiber 171 and second optical fiber 172 may be arranged, for example, in a parallel manner to form a fiber array module. For example, the first optical fiber 171 and second optical fiber 172 may be a lensed fiber in which a lens shape for an optical connection may be formed at a tip portion of the optical fiber (e.g., optical fiber 171 and second optical fiber 172) facing the surface of the grating coupler 126.

The first optical fiber 171 and second optical fiber 172 may be bonded to the grating coupler 126 by applying the optical interface layer 173 to the end of the first optical fiber 171 and the end of the second optical fiber 172 while precisely positioned within the GCO 126a. The optical interface layer 173 may include clear (or transparent) adhesive or other suitable optical glue or optical grease. The optical interface layer 173 may be facilitated by the optical adhesive to provide optical transparency and mechanical fixation. In particular, the optical interface layer 173 may include a layer of index-matching adhesive, in which case the optical interface layer 173 may be index-matched to the first optical fiber 171 and second optical fiber 172 and to the upper surface of the grating coupler 126 in order to reduce optical loss. That is, the refractive index and the thickness of the optical interface layer 173 may be adjusted according to the refractive indices of the first die 120, the first optical fiber 171 and the second optical fiber 172. The optical interface layer 173 may include a single-layer or multi-layer structure. The material of the optical interface layer 173 may include an epoxy-based compound, a silicone-based compound, an acrylic-based compound, a combination thereof, or the like.

The photonic integrated circuit 128 may be used for processing, receiving, and/or transmitting optical signals (e.g., the input optical signal and the output optical signal). The photonic integrated circuit 128 may include, for example, a photonic modulator for generating an output optical signal under the control of an electrical control signal (e.g., from the second die 130), and transmit an output optical signal to the second optical fiber 172. The photonic integrated circuit 128 may also an optical transceiver for transmitting optical signals and receiving optical signals. The photonic integrated circuit 128 may convert an input optical signal from the first optical fiber 171 to an input electrical signal to be transmitted to the second die 130. The photonic integrated circuit 128 may also convert an output electrical signal from the second die 130 to an output optical signal to be transmitted by the second optical fiber 172.

The first die 120 may also include other active optical devices and/or passive optical devices for the input of optical signals by the first optical fiber 171 and output of optical signals by the second optical fiber 172. The active optical devices and/or passive optical devices may include I/O couplers, edge couplers, lasers, photodiodes, detectors, waveguides, splitters, converters, switches, grating couplers, etc.

The light source device 160 may be mounted on the upper surface of the dielectric layer 124 and may be optically coupled to the photonic integrated circuit 128 and, in particular, to the photonic modulator in the photonic integrated circuit 128. The light source device 160 may be fixed to the upper surface of the dielectric layer 124 by an adhesive such as an epoxy adhesive. The light source device 160 may generate a light (e.g., laser light) that may be used to generate the output optical signal. Alternatively, the first die 120 may include a light source device with the photonic modulator in the photonic integrated circuit 128.

The light source device 160 may include, for example, a laser micro-package (LAMP) device that may include a laser diode for producing a laser light that may be used to generate the output optical signal. In particular, the light source device 160 may be mounted over the photonic integrated circuit 128 and transmit light to the photonic integrated circuit 128 which the photonic modulator may modulate (e.g., under the control of the second die 130). That is, the light source device 160 may serve as a light resource by the photonic integrated circuit 128. The light source device 160 may include, for example, a laser micro package that may include a laser diode (e.g., an InP-based, multiple quantum well (MQW), buried heterostructure (BH), distributed feedback (DFB) laser diode) packaged with magnifying optics in a miniature hermetic silicon housing. The laser diode of the laser micro package may be optically coupled to the photonic integrated circuit 128.

The second die 130 may be mounted on the upper surface of the dielectric layer 124 by a plurality of microbumps 132. The second die 130 may be electrically connected to the photonic integrated circuit 128 by one or more of the interconnect structures 124a. The electronic integrated circuit in the second die 130 may process the input electrical signal generated by the photonic integrated circuit 128 from the input optical signal. The second die 130 may include a logic IC die, memory controller die, analog IC die, application-specific IC (ASIC) die, or the like. The second die 130 may also include a package structure in which a plurality of die components may be encapsulated in a packaging encapsulation.

The interposer module 140 may be mounted to the upper surface of the dielectric layer 124 by a plurality of copper C4 bumps 148 that may be connected to contact pads in the upper surface of the dielectric layer 124. The interposer module 140 may be electrically connected to the electronic integrated circuit in the second die 130 by the interconnect structures 124a in the dielectric layer 124. The electronic integrated circuit may include, for example, a memory controller circuit for controlling a memory operation in the interposer module 140.

An underfill layer 147 may be formed on the upper surface of the dielectric layer 124 and fill a space between the upper surface and the second die 130 and between the upper surface and the interposer module 140. As illustrated in FIG. 3, the underfill layer 147 may also be formed between the second die 130 and the interposer module 140, so as to bond a side surface of the second die 130 to a side surface of the interposer module 140. The material of the underfill layer 147 may include, for example, an epoxy-based polymeric material. The underfill layer 147 material may encapsulate and protect the microbumps 132 connecting the second die 130 to the upper surface of the dielectric layer 124, and may encapsulate and protect the copper C4 humps 148 connecting the interposer module 140 to the upper surface of the dielectric layer 124.

The integration of the first die 120 (e.g., photonic die) including the photonic integrated circuit 128 into the package substrate 110 may provide for efficient transmission of optical signals into and out of the package assembly 100. In an operation of inputting an optical signal to the package assembly 100, the optical waveguide 127 may guide the input optical signal from the grating coupler 126 to the photonic integrated circuit 128. The second die 130 may transmit a signal to the photonic integrated circuit 128 to analyze the input optical signal and convert the input optical signal to an input electrical signal. Alternatively, the photonic integrated circuit 128 may convert the input optical signal into an input electrical signal and transmit the input electrical signal to the electronic integrated circuit in the second die 130. The electronic integrated circuit may generate an interposer module input signal 101 (e.g., see FIG. 1) based on the input electrical signal, and transmit the interposer module input signal to the interposer module 140 through one or more interconnect structures 124a in the dielectric layer 124 of the first die 120.

In an operation of outputting an optical signal from the package assembly 100, the interposer module 140 may generate an interposer module output signal 102 (e.g., an electrical signal) (e.g., see FIG. 1) and transmit the interposer module output signal to the second die 130 through one or more interconnect structures 124a in the dielectric layer 124. The second die 130 may transmit a control signal to the photonic modulator in the photonic integrated circuit 128 for modulating a light from the light source device 160 and thereby cause the photonic modulator to generate an output optical signal based on the interposer module output signal 102. Alternatively, based on the interposer module output signal 102, the electronic integrated circuit in the second die 130 may generate an output electrical signal and transmit the output electrical signal to the photonic integrated circuit 128. The photonic integrated circuit 128 may convert the output electrical signal into an output optical signal and transmit the output optical signal to the optical waveguide 127.

Figure 4A:
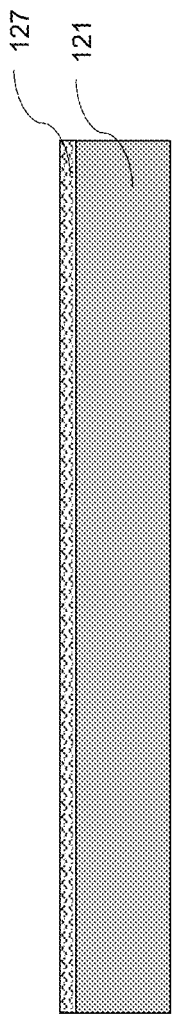
FIG. 4A illustrates an intermediate structure in which an optical waveguide may be formed on a semiconductor substrate (e.g., photonic silicon substrate) according to one or more embodiments.

FIGS. 4A-4E illustrate a method of making the first die 120 (e.g., photonic die) according to one or more embodiments. FIG. 4A illustrates an intermediate structure in which an optical waveguide 127 may be formed on a semiconductor substrate 121 (e.g., photonic silicon substrate) according to one or more embodiments. The optical waveguide 127 may include, for example, a silicon waveguide that may include a silicon core and a cladding layer (e.g., SiO₂) formed on the silicon core. The optical waveguide 127 may be formed, for example, by performing on the photonic silicon layer 121 one or more processes that may include, for example, a photolithographic process, material deposition, dopant implantation, etc.

Figure 4B:
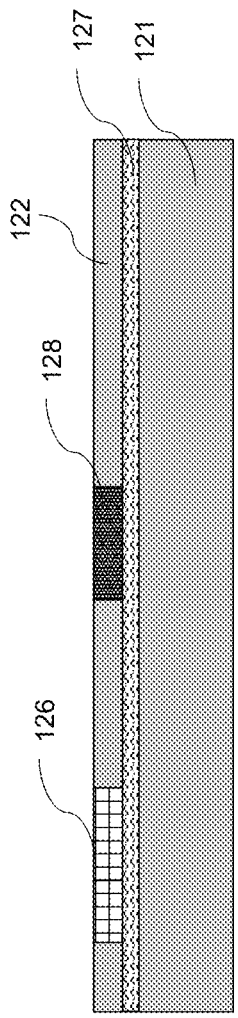
FIG. 4B illustrates an intermediate structure in which a semiconductor layer may be formed on the optical waveguide according to one or more embodiments.

FIG. 4B illustrates an intermediate structure in which a semiconductor layer 122 may be formed on the optical waveguide 127 according to one or more embodiments. The semiconductor layer 122 may include, for example, a silicon layer and may be formed by deposition. A grating coupler 126 may be formed in the semiconductor layer 122 using a variety of processing steps that may include photolithographic techniques to etch the semiconductor layer 122, depositing layers (e.g., dielectric layers, SiN layers, etc.) on the semiconductor layer 122, etc. to form grating structures (e.g., fin-shaped structures). A photonic integrated circuit 128 (e.g., including a photonic modulator) may also be formed on the in the semiconductor layer 122. The photonic integrated circuit 128 may modulate the light generated by the light source device 160 by application of an electric field to a material (e.g., silicon) through which the light may be transmitted, to generate the output optical signal.

Figure 4C:
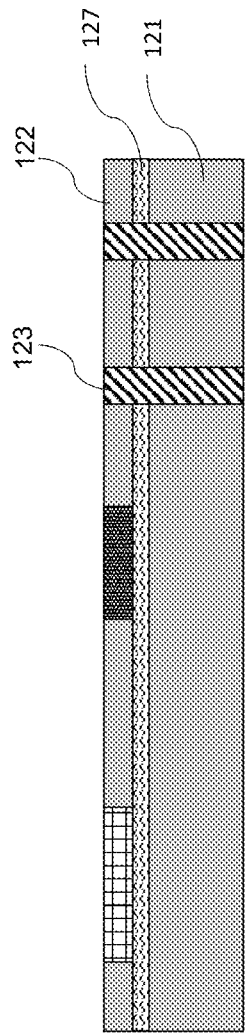
FIG. 4C illustrates an intermediate structure in which one or more through silicon vias (TSVs) may be formed according to one or more embodiments.

FIG. 4C illustrates an intermediate structure in which one or more through silicon vias (TSVs) 123 may be formed according to one or more embodiments. The TSVs 123 may be formed by forming one or more holes in the semiconductor substrate 121, optical waveguide 127 and semiconductor layer 122, as necessary, such as by photolithographic etching processes, depositing a metal layer on the semiconductor layer 122, and then etching the metal layer to complete the TSVs 123. The metal layer may include a metal (e.g., copper, silver, tungsten, titanium, gold, etc.) a metal alloy, or a combination thereof. It should be noted that the TSVs 123 may have a uniform or non-uniform diameter. In particular, the TSVs 123 may have a tapered configuration. That is, one end of the TSVs 123 (e.g., a lower end) may have a diameter that is less that a diameter of the other end of the TSVs 123 (e.g., an upper end). In addition, a sidewall of the TSVs 123 may include a dielectric layer that may line at least a portion of the sidewall. The dielectric layer may separate the metal layer of the TSVs 123 from the semiconductor substrate 121. The dielectric layer may include, for example, an oxide such as tetraethylorthosilicate (TEOS) or a low-k dielectric material. The dielectric layer may, for example, have a thickness in range from 50 nm to 400 nm and be formed in the TSVs 123 by deposition (e.g., plasma enhanced chemical vapor deposition (PECVD)).

Figure 4D:
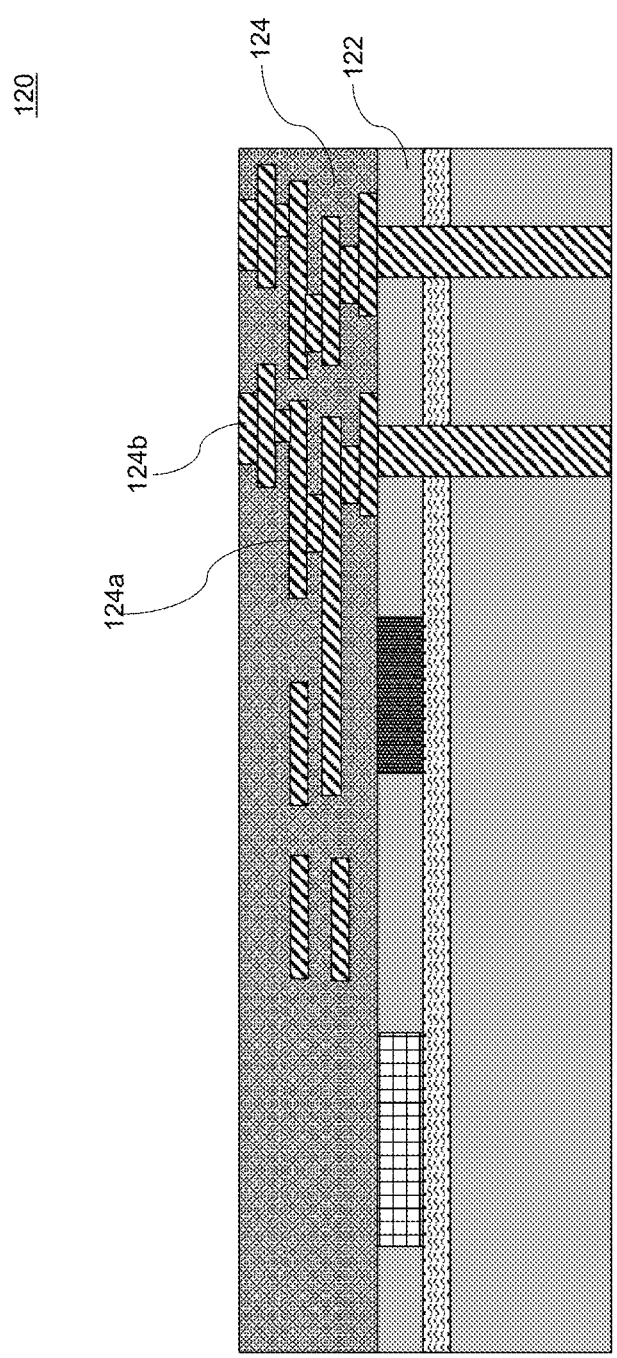
FIG. 4D illustrates an intermediate structure in which a dielectric layer may be formed on the semiconductor layer according to one or more embodiments.

FIG. 4D illustrates an intermediate structure in which a dielectric layer 124 may be formed on the semiconductor layer 122 according to one or more embodiments. The dielectric layer 124 may include a plurality of dielectric layers that may be formed, for example, by depositing a dielectric material in a series of steps. One or more interconnect structures 124a (e.g., redistribution layer (RDL) structure) may be formed in the plurality of dielectric layers. The interconnect structures 124a may be formed in a series of steps that may include depositing a dielectric layer, etching the dielectric layer to form a hole, depositing a metal layer on the dielectric layer and in the hole, etc. A bonding pad 124b may also be formed in the dielectric layer 124 and connected to the interconnect structures 124a. The interconnect structures 124a and bonding pad 124b may include a metal (e.g., copper, silver, tungsten, titanium, gold, etc.) a metal alloy, or a combination thereof.

Figure 4E:
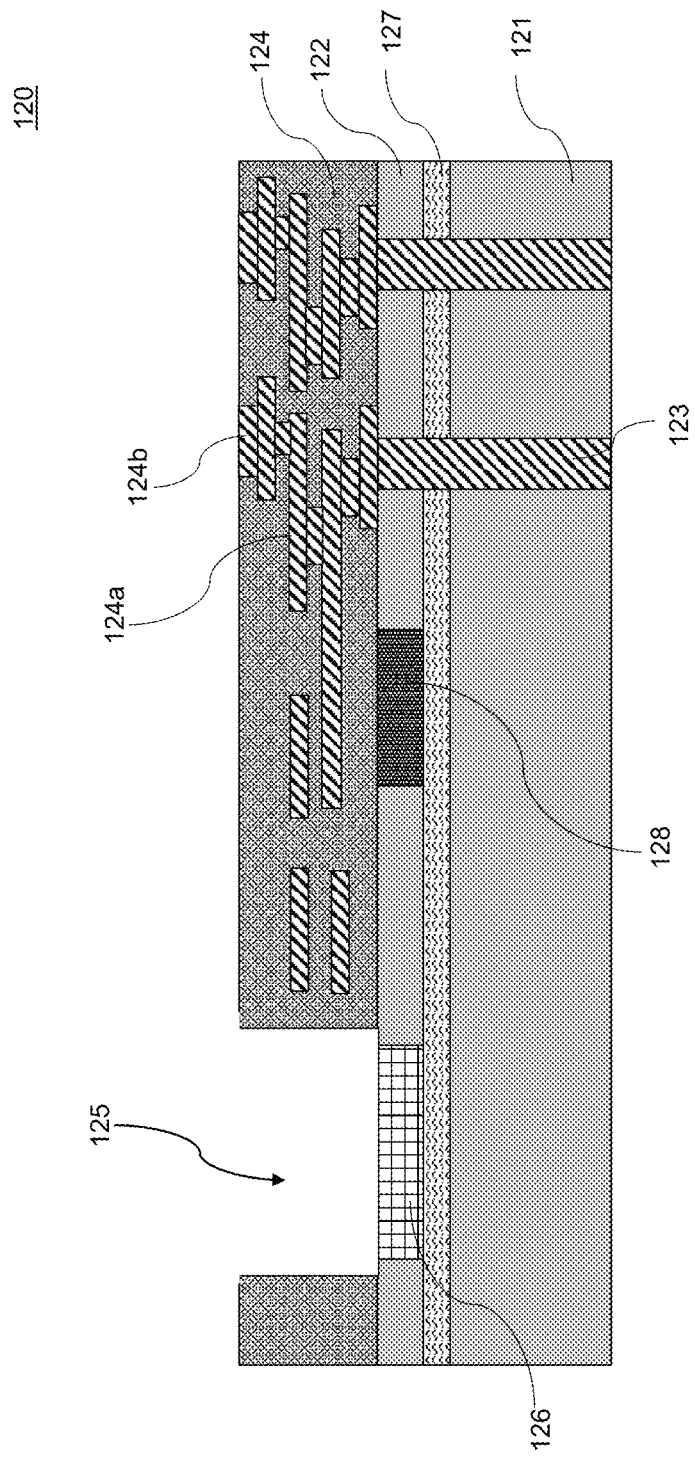
FIG. 4E illustrates the first die in which a grating coupler opening (GCO) may be formed in the dielectric layer according to one or more embodiments.

FIG. 4E illustrates the first die 120 in which a grating coupler opening (GCO) 126a may be formed in the dielectric layer 124 according to one or more embodiments. The GCO 126a may be formed, for example, by etching the dielectric layer 124 by a photolithographic process so as to expose an upper surface of the grating coupler 126 through opening 125. The GCO materials 126a may be subsequently deposited in the opening 125. The GCO 126a may be used, for example to attach optical fibers (e.g., first optical fiber 171, second optical fiber 172) to the grating coupler 126. It should be noted that the GCO 126a may not be formed in the dielectric layer 124 until after the first die 120 is assembled in the package substrate 110.

Figure 5A:
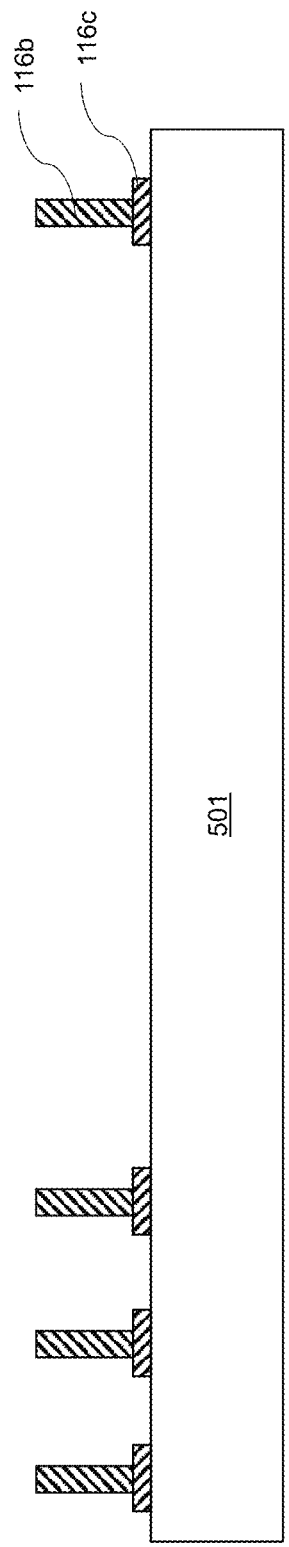
FIG. 5A illustrates an intermediate structure in which one or more bonding pads may be formed according to one or more embodiments.
Figure 5B:
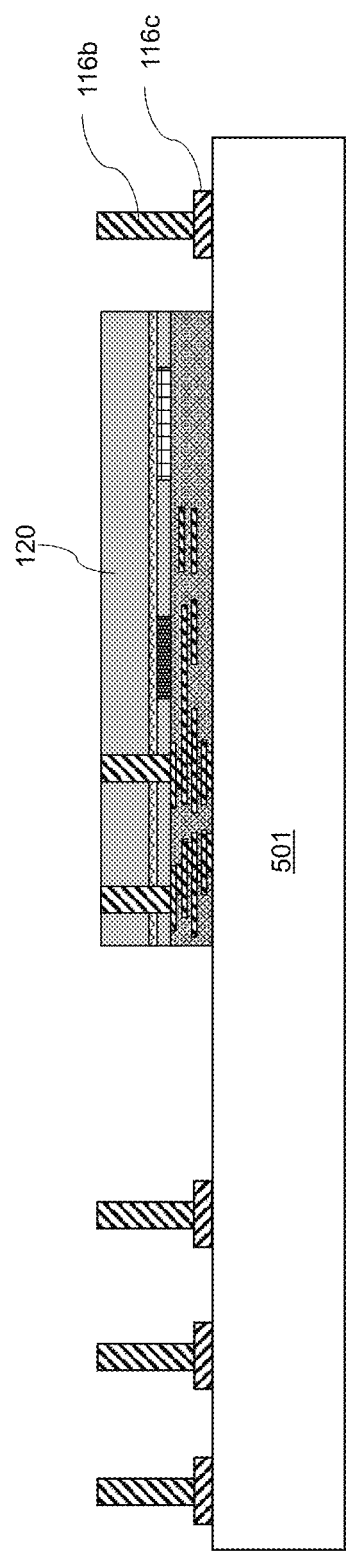
FIG. 5B illustrates an intermediate structure in which the first die may be mounted according to one or more embodiments.
Figure 5C:
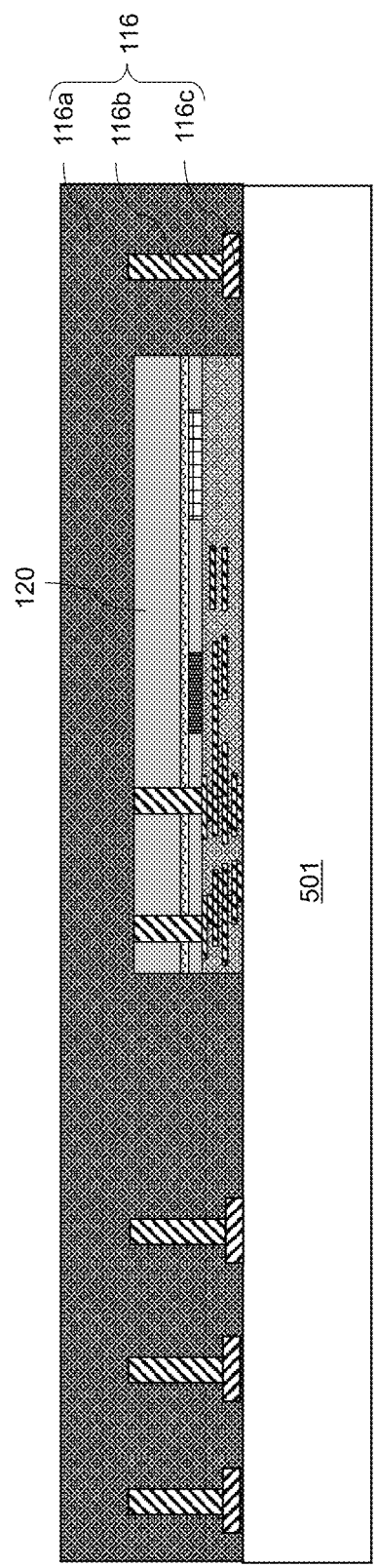
FIG. 5C illustrates an intermediate structure in which the second package substrate molding material layer may be formed according to one or more embodiments.
Figure 5D:
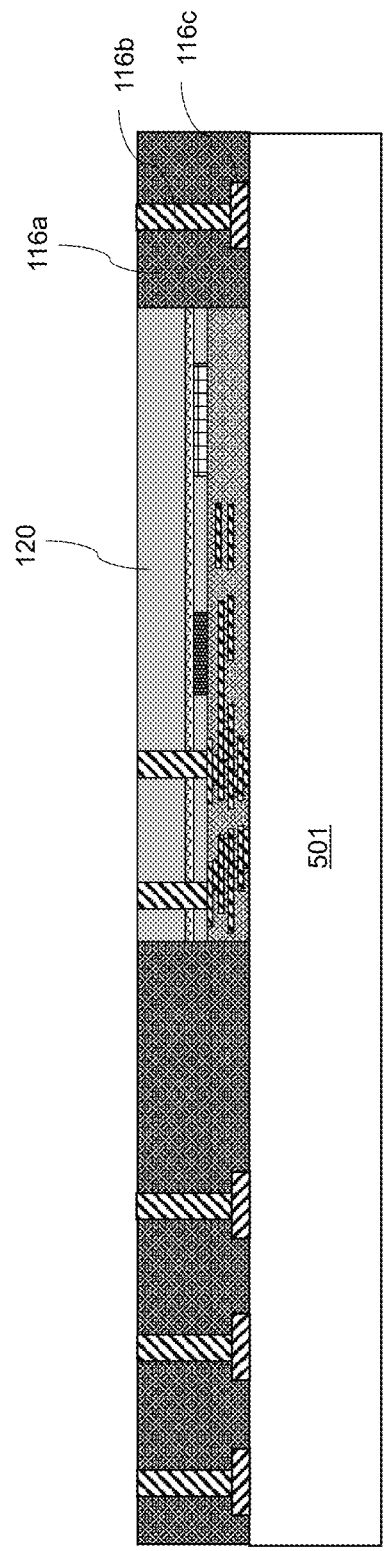
FIG. 5D illustrates an intermediate structure in which a grinding step may be performed on the molding material layer according to one or more embodiments.
Figure 5E:
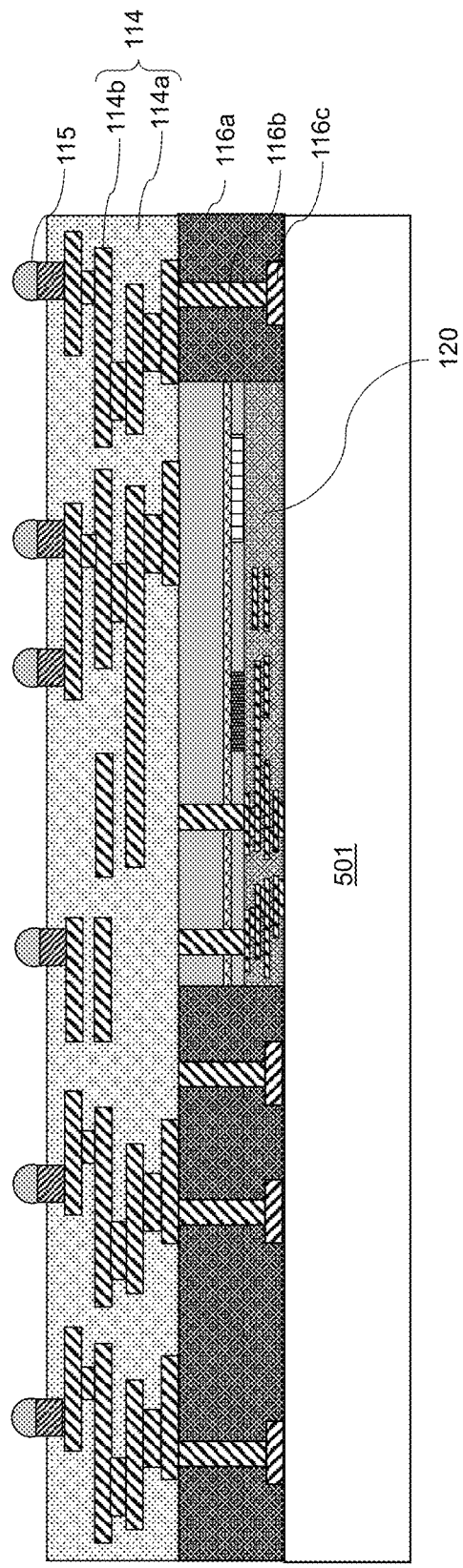
FIG. 5E illustrates an intermediate structure in which the front-side RDL may be formed according to one or more embodiments.
Figure 5F:
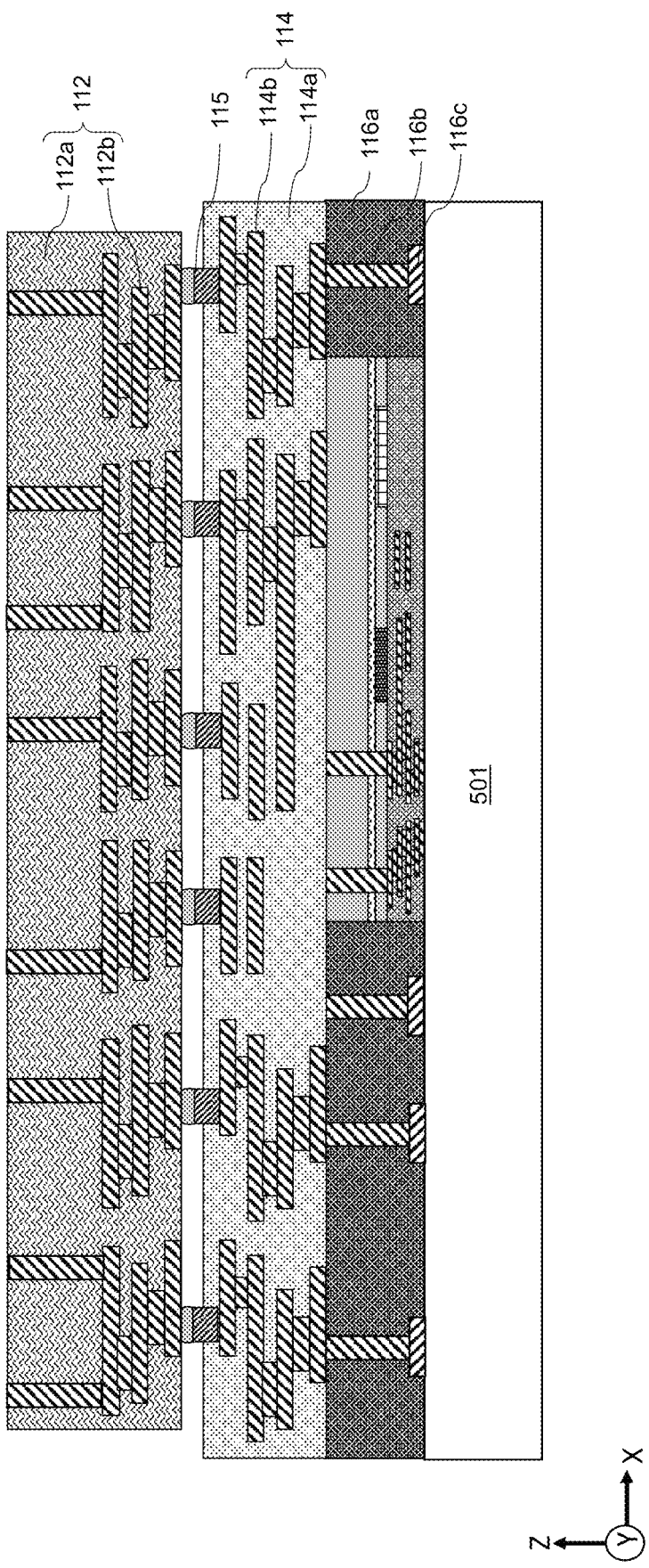
FIG. 5F illustrates an intermediate structure in which the core substrate may be mounted on the front-side RDL according to one or more embodiments.
Figure 5G:
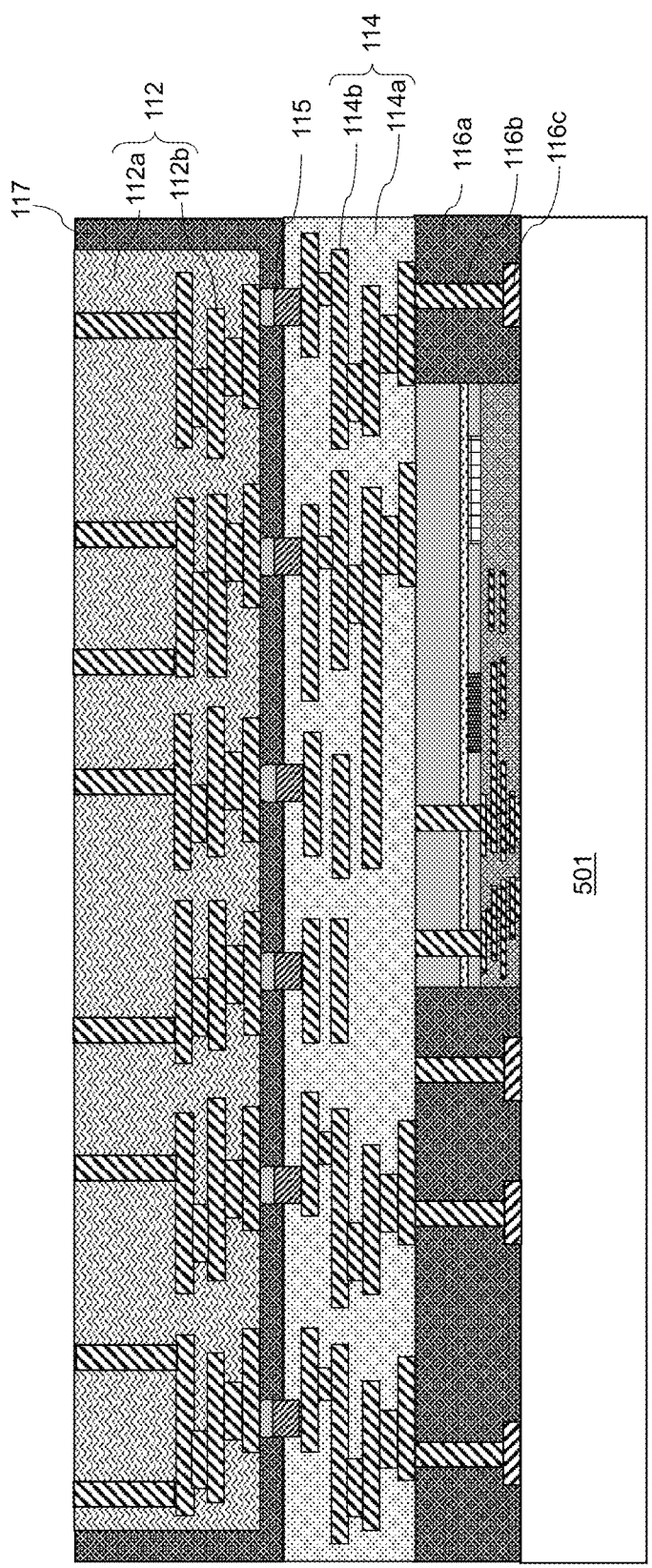
FIG. 5G illustrates an intermediate structure in which the first package substrate molding material layer may be formed on the core substrate according to one or more embodiments.
Figure 5H:
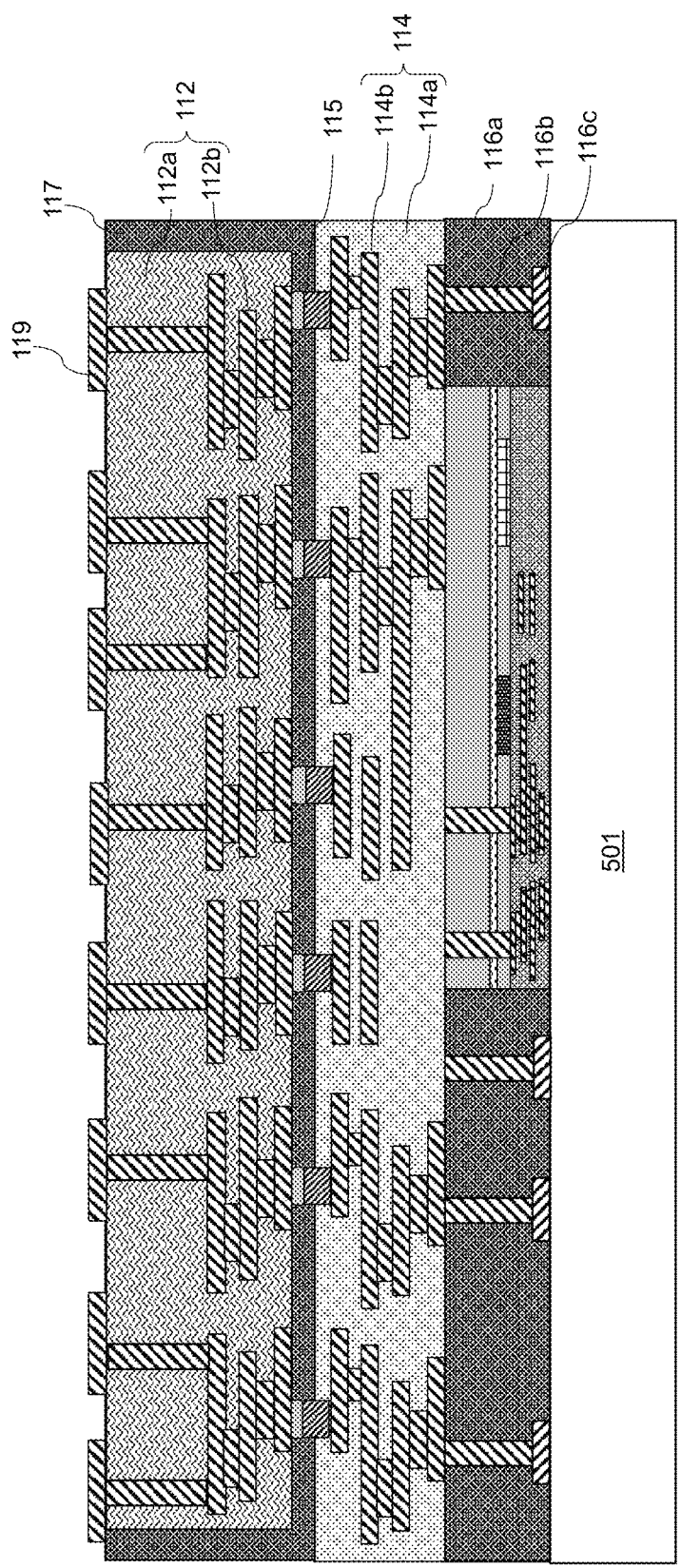
FIG. 5H illustrates an intermediate structure in which the back-side RDL may be formed on the core substrate according to one or more embodiments.
Figure 5I:
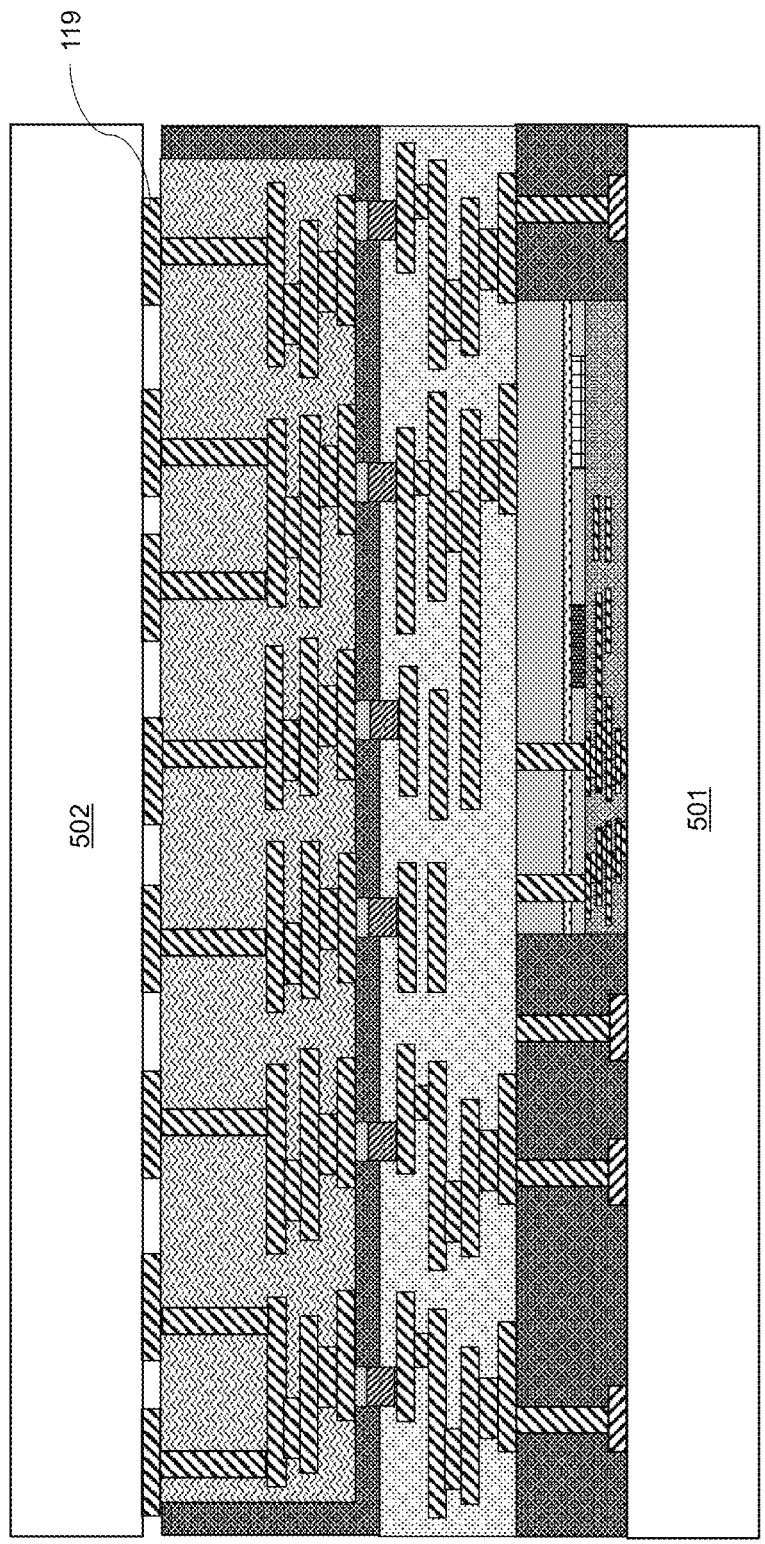
FIG. 5I illustrates an intermediate structure in which a second glass substrate may be bonded to the back-side RDL according to one or more embodiments.
Figure 5J:
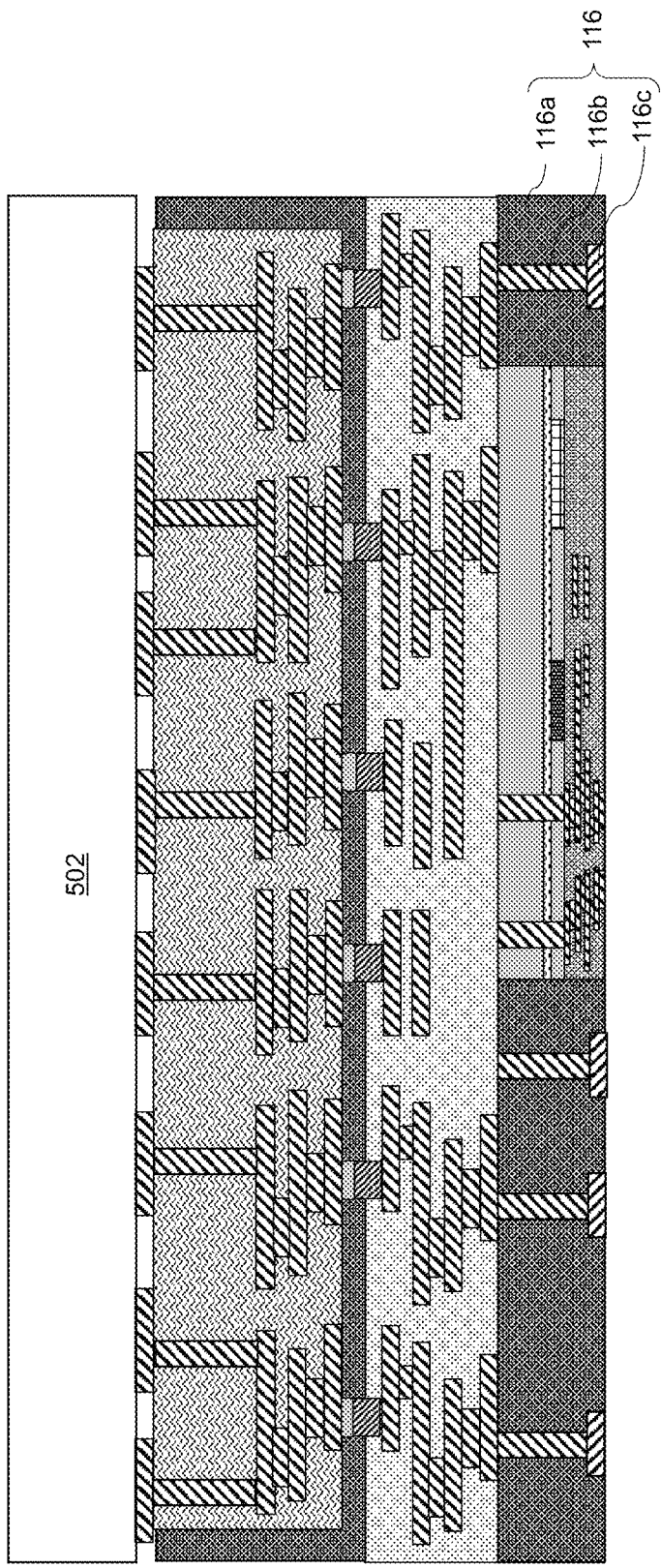
FIG. 5J illustrates an intermediate structure in which a first glass substrate may be de-bonded according to one or more embodiments.
Figure 5K:
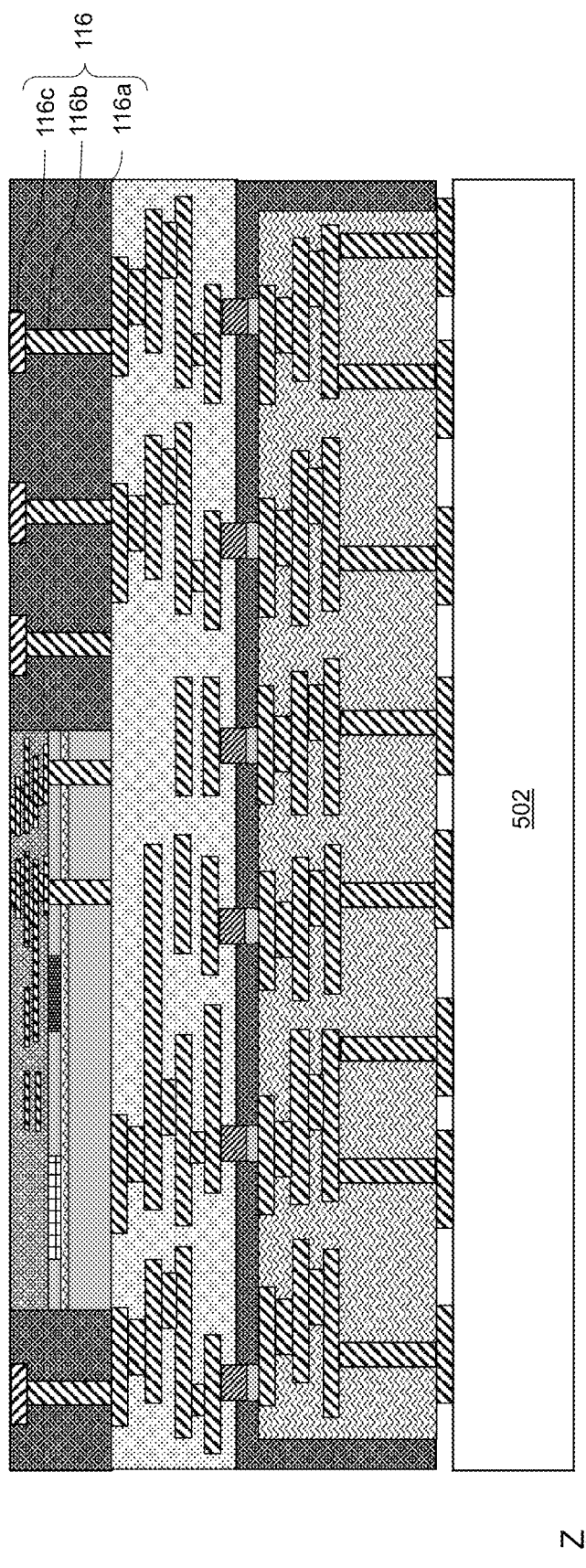
FIG. 5K illustrates an intermediate structure including the second glass substrate according to one or more embodiments.
Figure 5L:
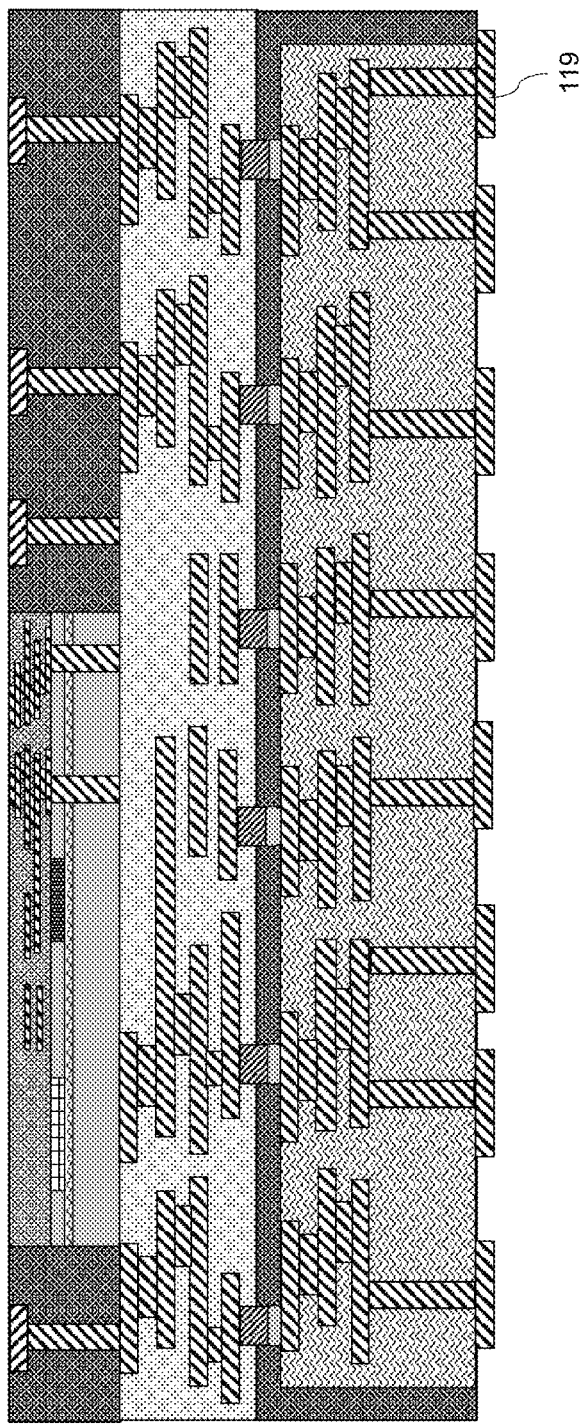
FIG. 5L illustrates an intermediate structure in which the second glass substrate may be de-bonded according to one or more embodiments
Figure 5M:
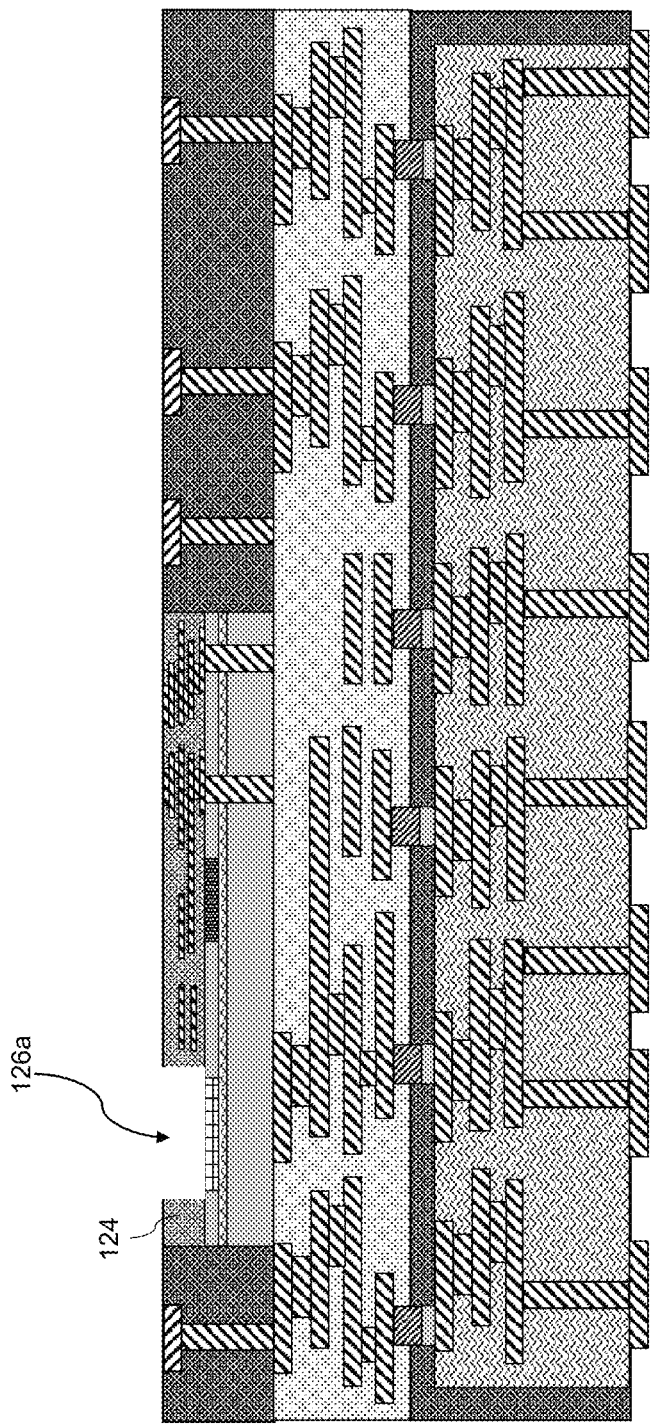
FIG. 5M illustrates an intermediate structure in which the GCO may be formed according to one or more embodiments.
Figure 5N:
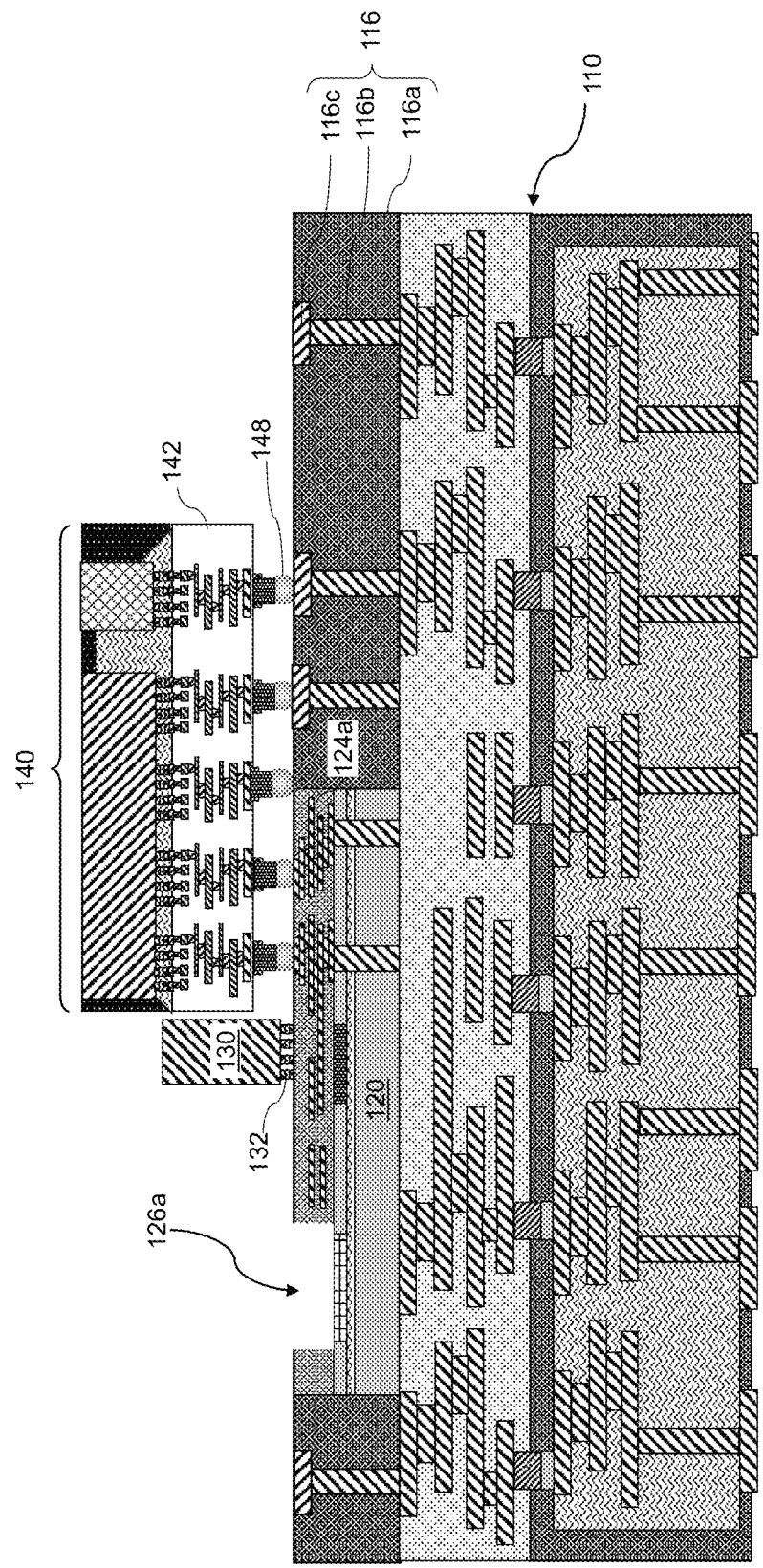
FIG. 5N illustrates an intermediate structure in which the second die and interposer module (e.g., a chip on wafer (COW) device) may be mounted according to one or more embodiments.
Figure 5O:
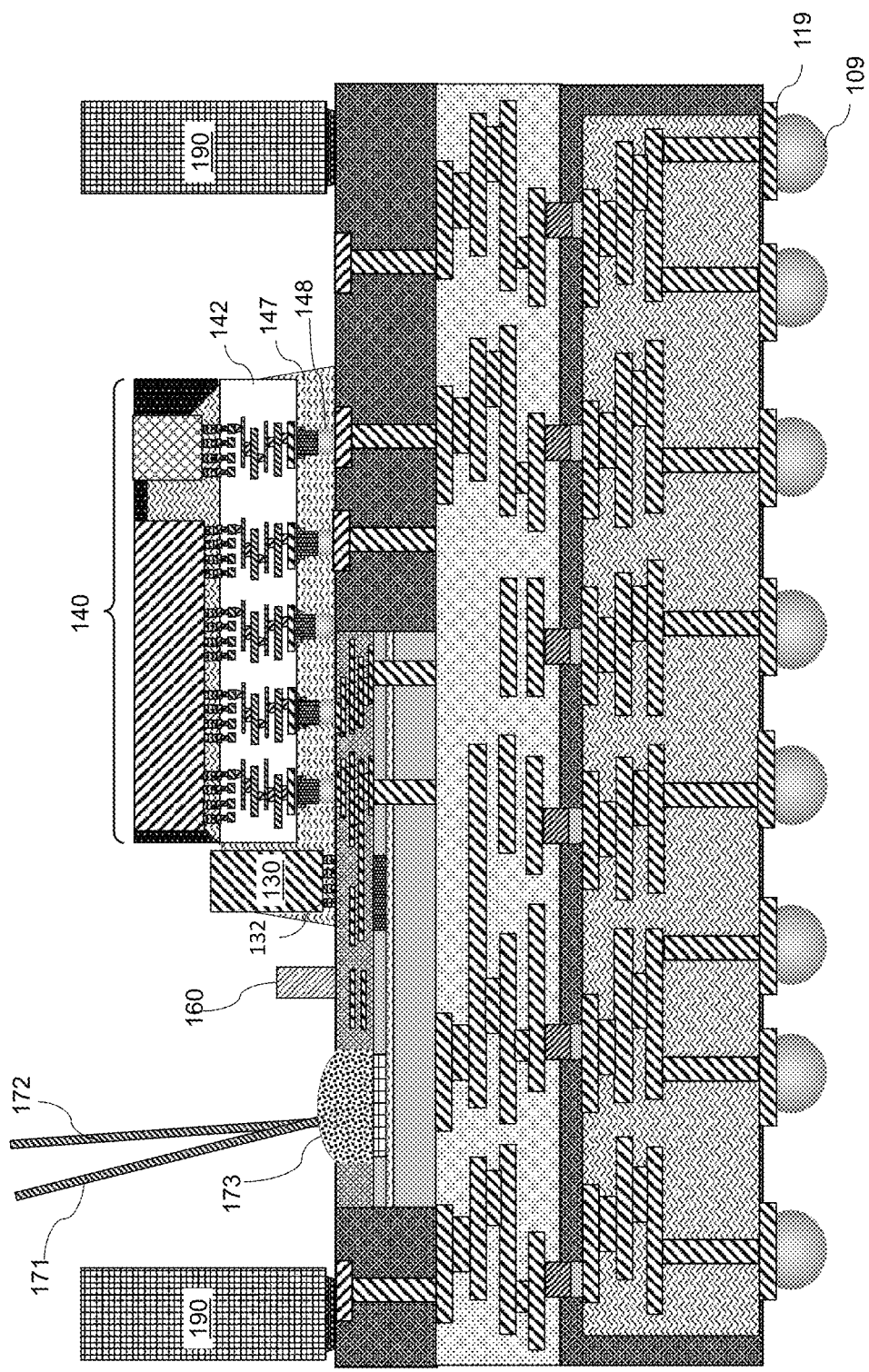
FIG. 5O illustrates the completed package assembly according to one or more embodiments.

FIGS. 5A-5O illustrate a method of making the package assembly 100 according to one or more embodiments. FIG. 5A illustrates an intermediate structure in which one or more bonding pads 116c may be formed according to one or more embodiments. In FIG. 5A, the bonding pads 116c may be formed, for example, on a first glass substrate 501 (e.g., glass carrier). The bonding pads 116c may be formed by depositing a metal material layer (e.g., by chemical vapor deposition (CVD), physical vapor deposition (PVD), sputtering, etc.) and patterning the metal material layer by a photolithographic process (e.g., masking, etching, etc.). One or more via structures 116b may be formed on the one or more bonding pads 116c, respectively. The via structures 116c may also be formed by depositing a metal material layer (e.g., by chemical vapor deposition (CVD), physical vapor deposition (PVD), sputtering, etc.) and patterning the metal material layer by a photolithographic process (e.g., masking, etching, etc.). The via structures 116b and bonding pads 116c may each include one or more metal layers and may be formed, for example, of a metal (e.g., copper, silver, tungsten, titanium, gold, etc.), metal alloy, a combination thereof.

FIG. 5B illustrates an intermediate structure in which the first die 120 may be mounted according to one or more embodiments. A bonding film (e.g., a laser-releasable temporary bonding film) may be formed on a surface of the first glass substrate 501. The first die 120 may then be flipped and mounted on the bonding film so that an upper surface of the dielectric layer 124 in the first die 120 contacts the bonding film.

FIG. 5C illustrates an intermediate structure in which the second package substrate molding material layer 116 may be formed according to one or more embodiments. The second package substrate molding material layer 116 may be formed, for example, by a molding process in which a mold is formed, and a molding material is injected into the mold so as to form the molding material layer 116a that encapsulates the via structures 116b, bonding pads, and the first die 120. The molding material layer 116a may include, for example, an epoxy material (e.g., epoxy molding compound (EMC)) such as a heat-curable epoxy resin.

FIG. 5D illustrates an intermediate structure in which a grinding step has been performed on the molding material layer 116a according to one or more embodiments. As illustrated in FIG. 5D, in the grinding step, the molding material layer 116a may be "thinned" by grinding the molding material layer 116a, for example, using a grinding wheel. The grinding step may be performed, for example, until a bottom surface of the TSVs 123 and a bottom surface of the via structures 116b are exposed.

FIG. 5E illustrates an intermediate structure in which the front-side RDL 114 may be formed according to one or more embodiments. As illustrated in FIG. 5E, the front-side RDL 114 may be formed on the second package substrate molding material layer 116. The front-side RDL 114 may include a front-side RDL dielectric layer 114a and one or more metal interconnect structures 114b (e.g., metal redistribution layers) formed in the front-side RDL dielectric layer 114a. The front-side RDL 114 may be formed by a process in which a dielectric layer (e.g., front-side RDL dielectric layer 114a) is deposited, an opening may be formed in the dielectric layer by a photolithographic process, and a metal material (e.g., metal interconnect structures 114b) may be formed in the opening. The process is continued until a plurality of dielectric layer are formed and a plurality of metal layers (e.g., metal redistribution layers) have been formed in the plurality of dielectric layers. The RDL dielectric layer 114a may include, for example, a dielectric polymer material such as polyimide (PI), benzocyclobutene (BCB), or polybenzobisoxazole (PBO). Other suitable materials are within the contemplated scope of disclosure. Microbumps 115 may be formed in the RDL dielectric layer 114a so as to connect to the metal interconnect structures 114b.

FIG. 5F illustrates an intermediate structure in which the core substrate 112 is mounted on the front-side RDL 114 according to one or more embodiments. The core substrate 112 may be aligned with the front-side RDL 114 so that the metal interconnect structures 112b in the core substrate dielectric layer 112a are aligned with the microbumps 115. As illustrated in FIG. 5F, the core substrate 112 may have a width (in the x-direction) which is less than a width of the front-side RDL 114. Heat may then be applied in order to bond the metal interconnect structures 112b to the microbumps 115.

FIG. 5G illustrates an intermediate structure in which the first package substrate molding material layer 117 is formed on the core substrate 112 according to one or more embodiments. The first package substrate molding material layer 117 may be formed, for example, by a molding process in which a mold is formed, and a molding material is injected into the mold so as to form the first package substrate molding material layer 117 so as to encapsulate the microbumps 115 and the core substrate 112. The first package substrate molding material layer 117 may include, for example, an epoxy material (e.g., epoxy molding compound (EMC)) such as a heat-curable epoxy resin. A grinding step may then be performed on the first package substrate molding material layer 117 by using, for example, a grinding wheel. The grinding step may be performed, for example, until a bottom surface of the metal interconnect structures 112b in the core substrate dielectric layer 112a are exposed.

FIG. 5H illustrates an intermediate structure in which the back-side RDL 119 is formed on the core substrate 112 according to one or more embodiments. The back-side RDL 119 may be formed by depositing a metal material layer (e.g., by chemical vapor deposition (CVD), physical vapor deposition (PVD), sputtering, etc.) and patterning the metal material layer by a photolithographic process (e.g., masking, etching, etc.). The back-side RDL 119 may include one or more metal layers and may be formed, for example, of a metal (e.g., copper, silver, tungsten, titanium, gold, etc.), metal alloy, a combination thereof.

FIG. 5I illustrates an intermediate structure in which a second glass substrate 502 may be bonded to the back-side RDL 119 according to one or more embodiments. A bonding film (e.g., a laser-releasable temporary bonding film) may be formed on a surface of the second glass substrate 502. The second glass substrate 502 may then be pressed onto the back-side RDL 119 so as to cause the bonding film to securely bond the second glass substrate 502 to the back-side RDL 119.

FIG. 5J illustrates an intermediate structure in which a first glass substrate 501 has been de-bonded according to one or more embodiments. Over the course or processing, the first glass substrate 501 may have become bonded to the bonding pads 116c, the molding material layer 116a and the first die 120. In this step, the first glass substrate 501 may be de-bonded from the bonding pads 116*c*, molding material layer 116*a* and first die 120 (e.g., by applying heat, laser, etc.). It is understood that the first glass substrate 501 may be de-bonded before or after the bonding of the second glass substrate 502.

FIG. 5K illustrates an intermediate structure including the second glass substrate 502 according to one or more embodiments. As illustrated in FIG. 5K, the structure may be flipped so that the second glass substrate 502 is on the bottom of the structure. As this point, an optional front-side RDL may be formed on the second package substrate molding material layer 116.

FIG. 5L illustrates an intermediate structure in which the second glass substrate 502 has been de-bonded according to one or more embodiments. In this step, the second glass substrate 502 may be de-bonded from the back-side RDL 119 (e.g., by applying heat, laser, etc.).

FIG. 5M illustrates an intermediate structure in which the GCO 126*a* has been formed according to one or more embodiments. The GCO 126*a* may be formed, for example, by etching the dielectric layer 124 by a photolithographic process so as to expose an upper surface of the grating coupler 126.

FIG. 5N illustrates an intermediate structure in which the second die 130 and interposer module 140 (e.g., a chip on wafer (COW) device) have been mounted according to one or more embodiments. The interposer module 140 may be mounted on the second package substrate molding material layer 116 so that one or more copper C4 bumps 148 may contact the bonding pads 116*c* and provide an electrical connection to the package substrate 110. The interposer module 140 may also be mounted to the first die 120 by one or more copper C4 bumps 148 that are connected to one or more interconnect structures 124*a* in the first die 120. The second die 130 may also be mounted on the first die 120 by one or more microbumps 132.

FIG. 5O illustrates the completed package assembly 100 according to one or more embodiments. The underfill layer 147 may be formed on the package substrate 110 around the copper C4 bumps 148 and the microbumps 132. The underfill layer 147 may fill a space between the package substrate 110 and the interposer dielectric layer 142 of the interposer module 140, between the interposer dielectric layer 142 and the first die 120, and between the second die 130 and the first die 120. As noted above, the underfill layer 147 may also be formed between the second die 130 and the interposer module 140, so as to bond a side surface of the second die 130 to a side surface of the interposer module 140. The material of the underfill layer 147 may include, for example, an epoxy-haled polymeric material.

The light source device 160 may also be mounted on the first die 120 by an adhesive (e.g., epoxy). The light source device 160 may be mounted so as to be electrically coupled and optically coupled to the first die 120.

The first optical fiber 171 and second optical fiber 172 may be precisely aligned on the grating coupler 126 in the first die 120, and then the optical interface layer 173 (e.g., optical glue) may be applied to the GCO 126*a* and around the first optical fiber 171 and second optical fiber 172, so as to fix the first optical fiber 171 and second optical fiber 172 to the grating coupler 126. The ring 190 may also be mounted on the package substrate 110 in order to constrain a flatness of the package substrate 110. An adhesive (e.g., epoxy) may be used to adhere the ring 190 to the surface of the package substrate 110.

A ball-grid array including a plurality of solder balls 109 may be formed on the back-side RDL 119. The solder balls 109 may allow the package assembly 100 to be securely mounted on a substrate such as a printed circuit board and electrically coupled to the substrate.

FIG. 6 is a flowchart illustrating a method of making a package assembly according to one or more embodiments. The method may include a Step 610 of integrating a first die including a photonic integrated circuit into a substrate, a Step 620 of mounting a second die including an electronic integrated circuit on the first die, such that the electronic integrated circuit is coupled to the photonic integrated circuit, and a Step 630 of mounting an interposer module on the first die, such that the interposer module is coupled to the photonic integrated circuit.

Referring to FIGS. 1A-6, a package assembly 100 may be provided. The package assembly may include a package substrate 110 that may include: a first die 120 that includes a photonic integrated circuit 128; a second die 130 located on the first die 120, the second die 130 may include an electronic integrated circuit electrically connected to the photonic integrated circuit 128; and an interposer module 140 on the package substrate 110, at least a portion of the interposer module 140 being located on the first die 120 and electrically connected to the photonic integrated circuit 128.

In one embodiment, the package substrate 110 may include: a core substrate 112; a first package substrate molding material layer 117 that encapsulates the core substrate 112; and a second package substrate molding material layer 116 on the first package substrate molding material layer 117 and encapsulating the first die 120. In one embodiment, the core substrate 112 may include a metal interconnect structure 112*b*, and the second package substrate molding material layer 116 may include a via structure electrically connected to the metal interconnect structure 112*b* in the core substrate 112. In one embodiment, the package substrate 110 may include a front-side redistribution layer (RDL) 114 between the first package substrate molding material layer 117 and the second package substrate molding material layer 116, and the front-side RDL 114 may include a metal interconnect structure that electrically connects the via structure in the second package substrate molding material layer 116 to the metal interconnect structure in the core substrate 112. In one embodiment, the first die 120 may include an interconnect structure and the interposer module 140 may be electrically connected to the interconnect structure of the first die 120, and to the via structure in the second package substrate molding material layer 116. In one embodiment, the first die 120 may include an upper surface that may be substantially co-planar with an upper surface of the second package substrate molding material layer 116. In one embodiment, the package assembly 100 may further include an underfill layer formed on the package substrate 110 between the first die 120 and the interposer module 140. In one embodiment, the underfill layer may be formed between the first die 120 and the second die 130, and between the second die 130 and the interposer module 140. In one embodiment, the interposer module 140 may include a high-performance computing (HPC) module. In one embodiment, the second die 130 may include a controller for controlling an operation in the photonic integrated circuit 128. In one embodiment, the first die 120 may include a grating coupler 126 and a grating coupling opening (GCO) 126*a* for allowing an end of a first optical fiber to be connected to the grating coupler 126. In one embodiment, the first die 120 may include an optical waveguide 127 that optically couples the grating coupler 126 to the photonic integrated circuit 128. In one embodiment, the package assembly 100 may further include a light source device 160 mounted on the first die 120, and the photonic integrated circuit 128 may include a photonic modulator for modulating a light beam from the light source device 160 to generate an output optical signal.

Referring again to FIGS. 1A-6, a method of making a package assembly 100 may be provided and may include forming a package substrate 110 including a first die 120 that may include a photonic integrated circuit 128, mounting a second die 130 including an electronic integrated circuit on the first die 120, such that the electronic integrated circuit may be electrically connected to the photonic integrated circuit 128, and mounting an interposer module 140 on the package substrate 110, such that at least a portion of the interposer module 140 may be located on the first die 120 and electrically connected to the photonic integrated circuit 128.

In one embodiment, the forming of the package substrate 110 may include encapsulating a core substrate 112 in a first package substrate molding material layer 117, and encapsulating the first die 120 in a second package substrate molding material layer 116. In one embodiment, the forming of the package substrate 110 may include electrically connecting a metal interconnect structure 112b in the core substrate 112 to a via structure 116b in the second package substrate molding material layer 116. In one embodiment, the forming of the package substrate 110 may include forming a front-side redistribution layer (RDL) 114 between the first package substrate molding material layer 117 and the second package substrate molding material layer 116, and the front-side RDL 114 may include a metal interconnect structure 114b that electrically connects the via structure 116b in the second package substrate molding material layer 116 to the metal interconnect structure 112b in the core substrate 112. In one embodiment, the first die 120 may further include a grating coupler 126, and an optical waveguide 127 that optically couples the grating coupler 126 to the photonic integrated circuit 128. The method may further include mounting a light source device 160 on the first die 120, and the photonic integrated circuit 128 may include a photonic modulator for modulating a light beam from the light source device 160 to generate an output optical signal.

Referring again to FIGS. 1A-6, a package assembly 100 may be provided. The package assembly 100 may include: a core substrate 112 including a metal interconnect structure 112b; a first package substrate molding material layer 117 that encapsulates the core substrate 112; a second package substrate molding material layer 116 on the first package substrate molding material layer 117 and including a via structure 116b electrically connected to the metal interconnect structure 112b in the core substrate 112; and a first die 120 that may be encapsulated by the second package substrate molding material layer 116 and may include: a photonic integrated circuit 128; a grating coupler 126; and an optical waveguide 127 that optically couples the grating coupler 126 to the photonic integrated circuit 128.

In one embodiment, the package assembly 100 may further include a light source device 160 mounted on the first die 120, the photonic integrated circuit 128 including a photonic modulator for modulating a light beam from the light source device 160 to generate an output optical signal, a second die 130 located on the first die 120, the second die 130 including an electronic integrated circuit electrically connected to the photonic integrated circuit 128, an interposer module 140 on the package substrate 110, at least a portion of the interposer module 140 being located on the first die 120 and electrically connected to the photonic integrated circuit 128, the interposer module 140 being electrically connected to an interconnect structure in the first die 120, and to the via structure 116b in the second package substrate molding material layer 116, and an underfill layer 147 formed on the package substrate 110 between the first die 120 and the interposer module 140, between the first die 120 and the second die 130, and between the second die 130 and the interposer module 140.

FIG. 6 is a flowchart illustrating a method of making a package assembly according to one or more embodiments. The method may include a Step 610 of integrating a first die including a photonic integrated circuit into a substrate, a Step 620 of mounting a second die including an electronic integrated circuit on the first die, such that the electronic integrated circuit is coupled to the photonic integrated circuit, and a Step 630 of mounting an interposer module on the first die, such that the interposer module is coupled to the photonic integrated circuit.

Referring to FIGS. 1A-6, a package assembly 100 may be provided. The package assembly may include a package substrate 110 that may include: a first die 120 that includes a photonic integrated circuit 128; a second die 130 located on the first die 120, the second die 130 may include an electronic integrated circuit electrically connected to the photonic integrated circuit 128; and an interposer module 140 on the package substrate 110, at least a portion of the interposer module 140 being located on the first die 120 and electrically connected to the photonic integrated circuit 128.

In one embodiment, the package substrate 110 may include: a core substrate 112; a first package substrate molding material layer 117 that encapsulates the core substrate 112; and a second package substrate molding material layer 116 on the first package substrate molding material layer 117 and encapsulating the first die 120. In one embodiment, the core substrate 112 may include a metal interconnect structure 112b, and the second package substrate molding material layer 116 may include a via structure electrically connected to the metal interconnect structure 112b in the core substrate 112. In one embodiment, the package substrate 110 may include a front-side redistribution layer (RDL) 114 between the first package substrate molding material layer 117 and the second package substrate molding material layer 116, and the front-side RDL 114 may include a metal interconnect structure that electrically connects the via structure in the second package substrate molding material layer 116 to the metal interconnect structure in the core substrate 112. In one embodiment, the first die 120 may include an interconnect structure and the interposer module 140 may be electrically connected to the interconnect structure of the first die 120, and to the via structure in the second package substrate molding material layer 116. In one embodiment, the first die 120 may include an upper surface that may be substantially co-planar with an upper surface of the second package substrate molding material layer 116. In one embodiment, the package assembly 100 may further include an underfill layer formed on the package substrate 110 between the first die 120 and the interposer module 140. In one embodiment, the underfill layer may be formed between the first die 120 and the second die 130, and between the second die 130 and the interposer module 140. In one embodiment, the interposer module 140 may include a high-performance computing (HPC) module. In one embodiment, the second die 130 may include a controller for controlling an operation in the photonic integrated circuit 128. In one embodiment, the first die 120 may include a grating coupler 126 and a grating coupling opening (GCO) 126a for allowing an end of a first optical fiber to be connected to the grating coupler 126. In one embodiment, the first die 120 may include an optical waveguide 127 that optically couples the grating coupler 126 to the photonic integrated circuit 128. In one embodiment, the package assembly 100 may further include a light source device 160 mounted on the first die 120, and the photonic integrated circuit 128 may include a photonic modulator for modulating a light beam from the light source device 160 to generate an output optical signal.

Referring again to FIGS. 1A-6, a method of making a package assembly 100 may be provided and may include forming a package substrate 110 including a first die 120 that may include a photonic integrated circuit 128, mounting a second die 130 including an electronic integrated circuit on the first die 120, such that the electronic integrated circuit may be electrically connected to the photonic integrated circuit 128, and mounting an interposer module 140 on the package substrate 110, such that at least a portion of the interposer module 140 may be located on the first die 120 and electrically connected to the photonic integrated circuit 128.

In one embodiment, the forming of the package substrate 110 may include encapsulating a core substrate 112 in a first package substrate molding material layer 117, and encapsulating the first die 120 in a second package substrate molding material layer 116. In one embodiment, the forming of the package substrate 110 may include electrically connecting a metal interconnect structure 112b in the core substrate 112 to a via structure 116b in the second package substrate molding material layer 116. In one embodiment, the forming of the package substrate 110 may include forming a front-side redistribution layer (RDL) 114 between the first package substrate molding material layer 117 and the second package substrate molding material layer 116, and the front-side RDL 114 may include a metal interconnect structure 114b that electrically connects the via structure 116b in the second package substrate molding material layer 116 to the metal interconnect structure 112b in the core substrate 112. In one embodiment, the first die 120 may further include a grating coupler 126, and an optical waveguide 127 that optically couples the grating coupler 126 to the photonic integrated circuit 128. The method may further include mounting a light source device 160 on the first die 120, and the photonic integrated circuit 128 may include a photonic modulator for modulating a light beam from the light source device 160 to generate an output optical signal.

Referring again to FIGS. 1A-6, a package assembly 100 may be provided. The package assembly 100 may include: a core substrate 112 including a metal interconnect structure 112b; a first package substrate molding material layer 117 that encapsulates the core substrate 112; a second package substrate molding material layer 116 on the first package substrate molding material layer 117 and including a via structure 116b electrically connected to the metal interconnect structure 112b in the core substrate 112; and a first die 120 that may be encapsulated by the second package substrate molding material layer 116 and may include: a photonic integrated circuit 128; a grating coupler 126; and an optical waveguide 127 that optically couples the grating coupler 126 to the photonic integrated circuit 128.

The package assembly 100 may further include a light source device 160 mounted on the first die 120, the photonic integrated circuit 128 including a photonic modulator for modulating a light beam from the light source device 160 to generate an output optical signal, a second die 130 located on the first die 120, the second die 130 including an electronic integrated circuit electrically connected to the photonic integrated circuit 128, an interposer module 140 on the package substrate 110, at least a portion of the interposer module 140 being located on the first die 120 and electrically connected to the photonic integrated circuit 128, the interposer module 140 being electrically connected to an interconnect structure in the first die 120, and to the via structure 116b in the second package substrate molding material layer 116, and an underfill layer 147 formed on the package substrate 110 between the first die 120 and the interposer module 140, between the first die 120 and the second die 130, and between the second die 130 and the interposer module 140.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A package assembly, comprising:
    a package substrate comprising a first die that includes a photonic integrated circuit;
    a second die located on the first die, the second die comprising an electronic integrated circuit electrically connected to the photonic integrated circuit; and
    an interposer module comprising a die on the package substrate, wherein at least a portion of the interposer module is located on the first die and electrically connected to the photonic integrated circuit.

2. The package assembly of claim 1, wherein the package substrate further comprises:
    a core substrate;
    a first package substrate molding material layer that encapsulates the core substrate; and
    a second package substrate molding material layer on the first package substrate molding material layer and encapsulating the first die.

3. The package assembly of claim 2, wherein the core substrate includes a metal interconnect structure, and the second package substrate molding material layer includes a via structure electrically connected to the metal interconnect structure in the core substrate.

4. The package assembly of claim 3, wherein the package substrate further comprises a front-side redistribution layer (RDL) between the first package substrate molding material layer and the second package substrate molding material layer, the front-side RDL comprising a metal interconnect structure that electrically connects the via structure in the second package substrate molding material layer to the metal interconnect structure in the core substrate.

5. The package assembly of claim 3, wherein the first die comprises an interconnect structure and the interposer module is electrically connected to the interconnect structure of the first die, and to the via structure in the second package substrate molding material layer.

6. The package assembly of claim 2, wherein the first die comprises an upper surface that is substantially co-planar with an upper surface of the second package substrate molding material layer.

7. The package assembly of claim 1, further comprising:
an underfill layer formed on the package substrate between the first die and the interposer module.

8. The package assembly of claim 7, wherein the underfill layer is further formed between the first die and the second die, and between the second die and the interposer module.

9. The package assembly of claim 1, wherein the interposer module comprises a high-performance computing (HPC) module.

10. The package assembly of claim 1, wherein the second die comprises a controller for controlling an operation in the photonic integrated circuit.

11. The package assembly of claim 1, wherein the first die further comprises a grating coupler and a grating coupling opening (GCO) for allowing an end of a first optical fiber to be connected to the grating coupler.

12. The package assembly of claim 11, wherein the first die further comprises an optical waveguide that optically couples the grating coupler to the photonic integrated circuit.

13. The package assembly of claim 1, further comprising:
a light source device mounted on the first die, the photonic integrated circuit comprising a photonic modulator for modulating a light beam from the light source device to generate an output optical signal.

14. A method of making a package assembly, the method comprising:
forming a package substrate including a first die comprising a photonic integrated circuit;
mounting a second die including an electronic integrated circuit on the first die, such that the electronic integrated circuit is electrically connected to the photonic integrated circuit; and
mounting an interposer module comprising a die on the package substrate, such that at least a portion of the interposer module is located on the first die and electrically connected to the photonic integrated circuit.

15. The method of claim 14, wherein the forming of the package substrate comprises:
encapsulating a core substrate in a first package substrate molding material layer; and
encapsulating the first die in a second package substrate molding material layer.

16. The method of claim 15, wherein the forming of the package substrate comprises electrically connecting a metal interconnect structure in the core substrate to a via structure in the second package substrate molding material layer.

17. The method of claim 16, wherein the forming of the package substrate further comprises forming a front-side redistribution layer (RDL) between the first package substrate molding material layer and the second package substrate molding material layer, the front-side RDL comprising a metal interconnect structure that electrically connects the via structure in the second package substrate molding material layer to the metal interconnect structure in the core substrate.

18. The method of claim 14, wherein the forming of the package substrate comprises forming the first die to include a grating coupler, and an optical waveguide that optically couples the grating coupler to the photonic integrated circuit.

19. The method of claim 14, further comprising:
mounting a light source device on the first die, the photonic integrated circuit comprising a photonic modulator for modulating a light beam from the light source device to generate an output optical signal.

20. A package assembly, comprising:
a package substrate comprising:
a core substrate including a metal interconnect structure;
a first package substrate molding material layer that encapsulates the core substrate;
a second package substrate molding material layer on the first package substrate molding material layer, and including a via structure electrically connected to the metal interconnect structure in the core substrate; and
a first die that is encapsulated by the second package substrate molding material layer and comprises a photonic integrated circuit, a grating coupler, and an optical waveguide that optically couples the grating coupler to the photonic integrated circuit;
a light source device mounted on the first die, the photonic integrated circuit comprising a photonic modulator for modulating a light beam from the light source device to generate an output optical signal;
a second die located on the first die, the second die comprising an electronic integrated circuit electrically connected to the photonic integrated circuit;
an interposer module on the package substrate, at least a portion of the interposer module being located on the first die and electrically connected to the photonic integrated circuit, the interposer module being electrically connected to an interconnect structure in the first die, and to the via structure in the second package substrate molding material layer; and
an underfill layer formed on the package substrate between the first die and the interposer module, between the first die and the second die, and between the second die and the interposer module.

* * * * *